United States Patent
Collinge et al.

(10) Patent No.: US 8,909,557 B2
(45) Date of Patent: Dec. 9, 2014

(54) AUTHENTICATION ARRANGEMENT AND METHOD FOR USE WITH FINANCIAL TRANSACTION

(75) Inventors: Mehdi Collinge, Braine-l'Alleud (BE); Jean-Paul Edmond Rans, Glabais (BE); Paul Vanneste, Ottignies (BE); John Beric, London (GB); Dave Roberts, Warrington (GB); Thomas Tan, Singapore (SG); Fikret Ates, Namur (BE); Jonathan Grossar, Brussels (BE)

(73) Assignee: MasterCard International Incorporated, Purchase, NY (US)

( * ) Notice: Subject to any disclaimer, the term of this patent is extended or adjusted under 35 U.S.C. 154(b) by 556 days.

(21) Appl. No.: 12/584,704

(22) Filed: Sep. 9, 2009

(65) Prior Publication Data

US 2011/0022521 A1 Jan. 27, 2011

Related U.S. Application Data

(63) Continuation-in-part of application No. 10/506,016, filed as application No. PCT/BE03/00036 on Feb. 28, 2003.

(60) Provisional application No. 61/095,489, filed on Sep. 9, 2008.

(30) Foreign Application Priority Data

Feb. 28, 2002 (GB) .................................. 0204620.9

(51) Int. Cl.
| | |
|---|---|
| *G06Q 99/00* | (2006.01) |
| *G06Q 20/36* | (2012.01) |
| *G06Q 20/34* | (2012.01) |
| *G06Q 20/04* | (2012.01) |
| *G06Q 20/40* | (2012.01) |
| *G07F 7/10* | (2006.01) |
| *G06Q 20/12* | (2012.01) |
| *G06Q 20/38* | (2012.01) |

(52) U.S. Cl.
CPC .......... *G07F 7/1008* (2013.01); *G06Q 20/3674* (2013.01); *G06Q 20/341* (2013.01); *G06Q 20/04* (2013.01); *G06Q 20/40975* (2013.01); *G07F 7/1025* (2013.01); *G06Q 20/12* (2013.01); *G06Q 20/388* (2013.01)
USPC .................... 705/67; 705/64; 705/65; 705/66

(58) Field of Classification Search
USPC ...................................................... 705/64–67
See application file for complete search history.

(56) References Cited

U.S. PATENT DOCUMENTS

| | | | |
|---|---|---|---|
| 4,736,094 | A | 4/1988 | Yoshida |
| 5,768,390 | A | 6/1998 | Coppersmith et al. |

(Continued)

FOREIGN PATENT DOCUMENTS

| | | |
|---|---|---|
| EP | 1014317 | 6/2000 |
| EP | 1139200 | 10/2001 |

(Continued)

OTHER PUBLICATIONS ("EMV Integrated Circuit Card Specifications for Payment Systems", Version 4.2, Jun. 2008, Books 1-4, EMVCo, LLC.*
"EMV Integrated Circuit Card Specifications for Payment Systems", Version 4.2, Jun. 2008, Books 1-4, EMVCo, LLC, 197, 176, 238 and 154 pp.*
Chip Authentication Program Functional Architecture, MasterCard Worldwide, Feb. 2007.

(Continued)

*Primary Examiner* — James D Nigh
(74) *Attorney, Agent, or Firm* — Baker Botts L.L.P.

(57) ABSTRACT

A system and method for generating an authentication token which is used by an issuer associated with a integrated circuit card to authenticate a transaction. A personal card reader receives data, including an authentication cryptogram, from the integrated circuit card. The personal card reader uses the data received from the integrated circuit card to select one of at least two default bitmaps stored in a memory portion of the personal card reader. The personal card reader uses the selected default bitmap and the authentication cryptogram to build the authentication token.

24 Claims, 20 Drawing Sheets

(56) References Cited

U.S. PATENT DOCUMENTS

| | | | |
|---|---|---|---|
| 6,016,484 A * | 1/2000 | Williams et al. | 705/39 |
| 6,038,551 A | 3/2000 | Barlow et al. | |
| 6,173,400 B1 | 1/2001 | Perlman et al. | |
| 6,247,129 B1 | 6/2001 | Keathley et al. | |
| 6,282,522 B1 | 8/2001 | Davis et al. | |
| 6,327,578 B1 | 12/2001 | Linehan | |
| 6,480,935 B1 * | 11/2002 | Carper et al. | 711/115 |
| 6,834,271 B1 | 12/2004 | Hodgson et al. | |
| 6,856,975 B1 | 2/2005 | Inglis | |
| 7,177,848 B2 | 2/2007 | Hogan et al. | |
| 7,225,156 B2 | 5/2007 | Fisher et al. | |
| 7,318,048 B1 | 1/2008 | King | |
| 7,343,351 B1 | 3/2008 | Bishop et al. | |
| 7,499,888 B1 | 3/2009 | Tu et al. | |
| 7,669,772 B2 * | 3/2010 | Smets et al. | 235/492 |
| 2001/0032878 A1 | 10/2001 | Tsiounis et al. | |
| 2002/0133467 A1 | 9/2002 | Hobson et al. | |
| 2002/0138445 A1 | 9/2002 | Laage et al. | |
| 2008/0201577 A1 * | 8/2008 | Tuliani | 713/168 |
| 2008/0212771 A1 * | 9/2008 | Hauser | 380/44 |
| 2010/0037322 A1 * | 2/2010 | Blanchet | 726/26 |
| 2012/0036063 A1 * | 2/2012 | Sivapathasundram et al. | 705/39 |

FOREIGN PATENT DOCUMENTS

| | | |
|---|---|---|
| GB | 2374498 | 10/2002 |
| WO | WO 00/42733 | 7/2000 |
| WO | WO 01/72075 | 9/2001 |
| WO | WO 02/01520 | 1/2002 |

OTHER PUBLICATIONS

Chip Authentication Program Implementation Guide, MasterCard Worldwide, Mar. 2007.

CAP 2007—Specifications Updates, MasterCard Worldwide, Apr. 2008.

Rankl, Effing. "Handbuch der Chipkarten." XP002464978, pp. 238-243, Hanser Verlag (1999).

U.S. Appl. No. 10/506,016, filed Aug. 27, 2004.

U.S. Appl. No. 10/506,016, Non-Final Rejection dated May 1, 2008.

U.S. Appl. No. 10/506,016, Response to Non-Final Rejection dated Oct. 31, 2008.

U.S. Appl. No. 10/506,016, Final Rejection dated Feb. 23, 2009.

U.S. Appl. No. 10/506,016, Notice of Appeal dated May 26, 2009.

U.S. Appl. No. 10/506,016, Pre-Brief Conference Request dated May 26, 2009.

U.S. Appl. No. 10/506,016, Pre-Brief Appeal Conference Decision dated Jun. 11, 2009.

U.S. Appl. No. 10/506,016, Examiner Interview Summary dated Jul. 7, 2009.

U.S. Appl. No. 10/506,016, Non-Final Rejection dated Aug. 20, 2009.

U.S. Appl. No. 10/506,016, Response to Non-Final Rejection dated Feb. 22, 2010.

U.S. Appl. No. 10/506,016, Final Rejection dated Jun. 4, 2010.

U.S. Appl. No. 10/506,016, Response to Final Rejection and RCE dated Dec. 6, 2010.

* cited by examiner

X = No. of bytes in IIPD
Y = No. of bits in IIPB Data Token
Z = 184 − (8*X+32+Y)

AUTHENTICATION ARRANGEMENT AND METHOD FOR USE WITH FINANCIAL TRANSACTION

CROSS REFERENCE TO RELATED APPLICATIONS

This application is a continuation-in-part of U.S. application Ser. No. 10/506,016 filed Aug. 27, 2004 and is based on and claims priority to U.S. Provisional Application Ser. No. 61/095,489 filed Sep. 9, 2008. Both of these applications are incorporated herein by reference in their entireties.

BACKGROUND

It is known to make purchases on the Internet using a user terminal or main access device such as a personal computer. An architecture and system using a smart card for payment of goods and/or services purchased on-line over the Internet is known from U.S. Pat. No. 6,282,522. A client server on a client terminal controls the interaction with a consumer and interfaces to a card reader which accepts the consumer's smart card. A payment server on the Internet includes a computer and terminals that handle the transaction and data store. Also connected over the Internet is a merchant server advertising the goods and/or services offered by a merchant for sale on a web site. The merchant contracts with an acquirer to accept smart card payments for goods and/or services purchased over the Internet. A consumer uses his smart card at the client terminal in order to purchase goods and/or services from the remote merchant server. The Internet provides the routing functionality between the client terminal, merchant server and payment server.

FIG. 1 is a schematic representation of a user terminal or main access device 1, e.g. for accessing and browsing the Internet. Typically, the terminal 1 includes a central processor unit (CPU) 2 which is connected with memory 4 and input/output (I/O) devices 6 via a bus 3 for two way communication. I/O devices 6 may be a keyboard for entering data and a screen such as a visual display unit, e.g. a liquid crystal (LCD) or light emitting diode (LED) display, a CRT for displaying the progress of the transaction and/or for displaying messages or prompts. One of the I/O devices 6 may be a card reader 7 with which an Integrated Circuit Card (ICC) 5 may be read when it is introduced into a receiving slot in the reader 7. Alternatively, the card reader 7 may be a standalone device for reading the ICC 5. One of the I/O devices 6 may be also a modem 9 for accessing the Internet via an Internet Service Provider (ISP), e.g. a 56K, an ADSL, a wireless or a cable modem. The actual form of the terminal may vary greatly, and may include a processor such as the Pentium™ family of microprocessors supplied by Intel Corp. USA. Further, it is not necessary that the terminal 1 is all situated at one location, the various parts of the terminal such as the card reader 7, the I/O devices such as the keyboard and the display, the modem and the processor may located at different positions and connected by cables, wireless transmission or similar or be part of a local area network or interconnected by telecommunications networks.

FIG. 2 is a schematic representation of an Integrated Circuit Card (ICC) 5. The ICC 5 includes at least an input/output (I/O) port 10 and some permanent storage, e.g. a non-volatile memory which may be provided, for instance, by a an EEPROM 15 connected to the I/O port 10 via a bus 17 or by battery-backed random access memory (RAM). The I/O port 10 can be used for communication with the terminal 1 via card reader 7. An integrated circuit card is a card into which one or more integrated circuits are inserted to perform at least memory functions. Optionally, the ICC 5 may be a self-contained portable intelligent card and include a read/writable working memory e.g. volatile memory provided by a RAM 14 and a central processor 12 as well as all necessary circuits so that card ICC 5 can operate as a microprocessor, e.g. read only memory 13 for storing code, a sequencer 16 and connections with the card reader 7 for receiving the voltage sources Vss and VDD, a reset for the processor 12 and clock CLK to the sequencer 16. The ICC 5 can be used as bank card, credit card, debit card, electronic purse, health card, SIM card or similar. Other features of the microcontroller may be present but are not shown, such as a clock, a random number generator, interrupt control, control logic, a charge pump, power connections, and interface contacts that allow the card to communicate with the outside world. For example, an encryption module (not shown) is an optional hardware module used for performing a variety of encryption algorithms.

E-commerce merchants provide a web server with web-site access to commodities or services which can be accessed from user terminals as shown in FIG. 1 usually via web pages and these commodities and services may be purchased using cards such as the ICC 5 of FIG. 2. Many e-commerce merchants currently support cardholder profiling. Cardholder profiling consists of collecting information about the cardholder and using this data to streamline the cardholder's checkout process. The information collected typically includes billing address, shipping address, payment method details (e.g., card number and expiration date), email address and communication preferences. Most merchants also support non-profiled checkout. In this case, either the merchant does not support a cardholder profile database or the cardholder has chosen not to create a profile with this merchant. In either case, the non-profiled checkout process requires the cardholder to manually provide full shipping, billing and payment details. E-commerce merchants have implemented a variety of on-line checkout processes in an attempt to make the on-line shopping and purchase experiences more efficient for cardholders. A number of merchants have implemented an express checkout process (FIG. 3) intended to provide the cardholder with a streamlined purchase process by making full use of cardholder data and payment details stored in a profile database managed by the merchant. After browsing and selecting a particular item, or items, the Cardholder selects the express checkout option. The Merchant retrieves the Cardholder's profile, and presents a page at the user terminal combining details of the order and Cardholder's payment details. The Cardholder can review these details and submit/confirm the order.

Single-click checkout processes have been implemented by many merchants (see FIG. 4). The single-click checkout process is intended to provide the cardholder with the most efficient on-line purchase process available by making full use of cardholder data and payment details stored in a profile database managed by the merchant. After browsing and selecting a particular item, the Cardholder selects the single click order option which is generally available on all pages where an item's details and price are described. Usually the customer can either add the item to their "shopping basket," or order and pay for it with a "single click." The Merchant combines the details of the order and Cardholder's payment details to create an order, which is then acknowledged in a page to the Cardholder. Customers can usually cancel, amend or even combine multiple single click orders after the initial single-click through some form of customer administration/status page.

Most merchants support the standard checkout, which is usually a process of confirming the order details and collecting the Cardholder's payment details (see FIG. 5). The standard checkout process must be used by non-profiled cardholders since the payment details need to be collected. However even profiled cardholders will often opt to use the standard checkout if, for example, they wish to use different payment/personal details.

After browsing and selecting a particular item, or items, the Cardholder selects the standard checkout option. The Merchant presents a page showing details of the order and requesting the Cardholder's payment details. The Cardholder can review the order details, supply their payment details and if necessary other pertinent personal information and submit/confirm the order. In some cases this combined order details confirmation/payment details requesting page can be split into two pages, as shown in FIG. 5.

Today, remote transactions represent a significant transaction volume of all financial transactions. An explanation of various financial transaction systems can be found in books such as "Secure Electronic Commerce", W. Ford and M. S. Baum, Prentice Hall, 1997; "Digital Cash" by P. Wayner, Academic Press, 2.sup.nd edition, 1997; "Designing Systems for Internet Commerce", G. W. Treese and L. C. Stewart, Addison-Wesley, 1998. From a risk perspective these transactions are often not guaranteed and are therefore at the Acquirer/Merchant's risk. Security of such financial transfers on the Internet should be high but also allow convenient shopping without complex procedures. There is a continuing need to improve the ease and security of Internet financial transactions.

SUMMARY OF THE INVENTION

The present invention meets the goals of Cardholder authentication in financial transaction environments that traditionally suffer from chargebacks because no evidence could be provided that the Cardholder actually authorized the financial transaction. It offers a mechanism for securing the Internet channel by strongly authenticating the Cardholder at the point-of-interaction (POI) and providing explicit evidence both of card presence and that the Cardholder originated the transaction. The invention has a number of goals including at least one of:

Reducing chargebacks due to reasons of Cardholder non-authorized transactions.

Supporting both credit and debit transactions Minimizing acquirer system impacts Ensuring rapid Merchant adoption Supporting authentication for real account numbers, virtual accounts and pseudo account numbers.

In one embodiment, the invention provides a method for authenticating a transaction using an authentication token generated by a personal card reader, the method comprising storing at least two default bitmaps in a memory portion of a personal card reader, requesting data from an integrated circuit card (ICC), receiving a response from the ICC, the response comprising an authentication cryptogram, selecting one of the at least two default bitmaps using a bitmap selection mechanism, building the authentication token using the selected default bitmap and the authentication cryptogram, and communicating the authentication token to a third party, wherein an issuer associated with the ICC uses at least a part of the authentication token to authenticate the transaction.

In another embodiment, the invention provides a personal card reader for generating an authentication token for use in authenticating a transaction, the personal card reader comprising a memory portion configured to store at least two default bitmaps, a transmitter configured to request data from an integrated circuit card (ICC), the transmitter further configured to communicate an authentication token to a third party, a receiver configured to receive a response from the ICC, the response comprising an authentication cryptogram, a bitmap selection mechanism configured to select one of the at least two default bitmaps, and an authentication token generation unit configured to build an authentication token using the authentication cryptogram and the selected default bitmap, wherein the authentication token is used by an issuer associated with the ICC to authenticate the transaction.

DETAILED DESCRIPTION OF THE DRAWINGS

The present invention relates to an ICC Authentication Program, e.g. for e-commerce applications using a Personal Card-reader (PCR) which generates authentication tokens for transport to the Issuer in a Universal Cardholder Authentication Field (UCAF). In designing the token generation scheme, cardholder friendliness—through paring down the data requirements to their bare minimum, using check digits, etc.—has been provided. In one aspect the present invention includes a functional architecture of a scheme used to achieve ICC based authentication using a personal card-reader, for Internet based e-commerce transactions via the UCAF.

The terms Customer and Cardholder are, for the purposes of this invention, interchangeable, however for consistency usually the term Cardholder is used. It does not strictly mean the person to whom the card was issued but rather refers to a person in possession of both the card and the authentication mechanism of that card, e.g. a PIN as one example. In the whole of the text and figures reference to Merchant, Acquirer and Issuer refers to respective servers in communication with the Internet when entry of data or passing of messages, web pages etc. is concerned.

Figure 1:
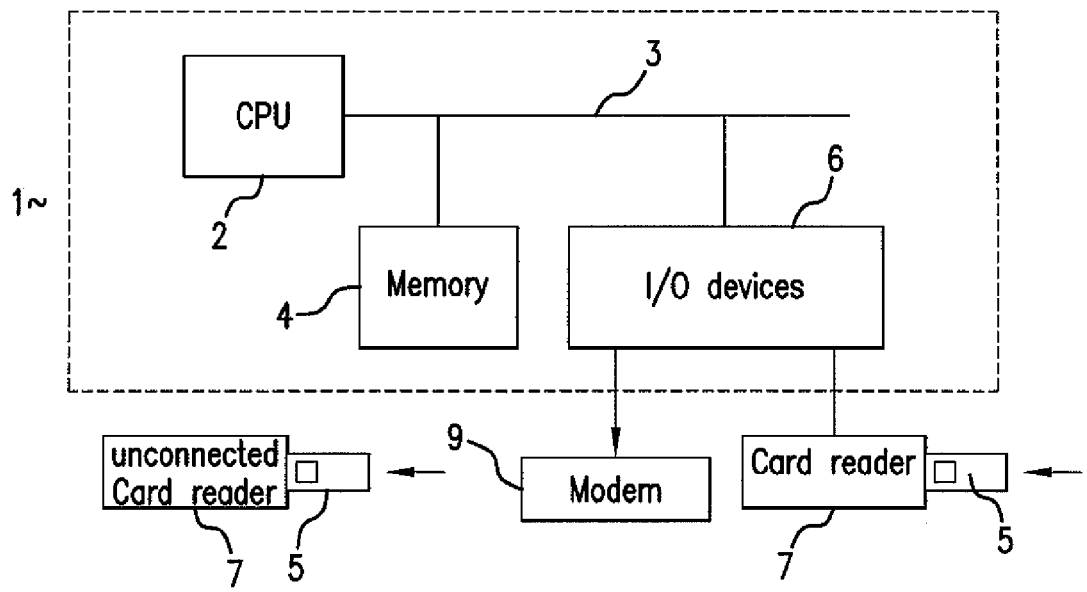
FIG. 1 shows a main access device which can be used with the present invention.
Figure 2:
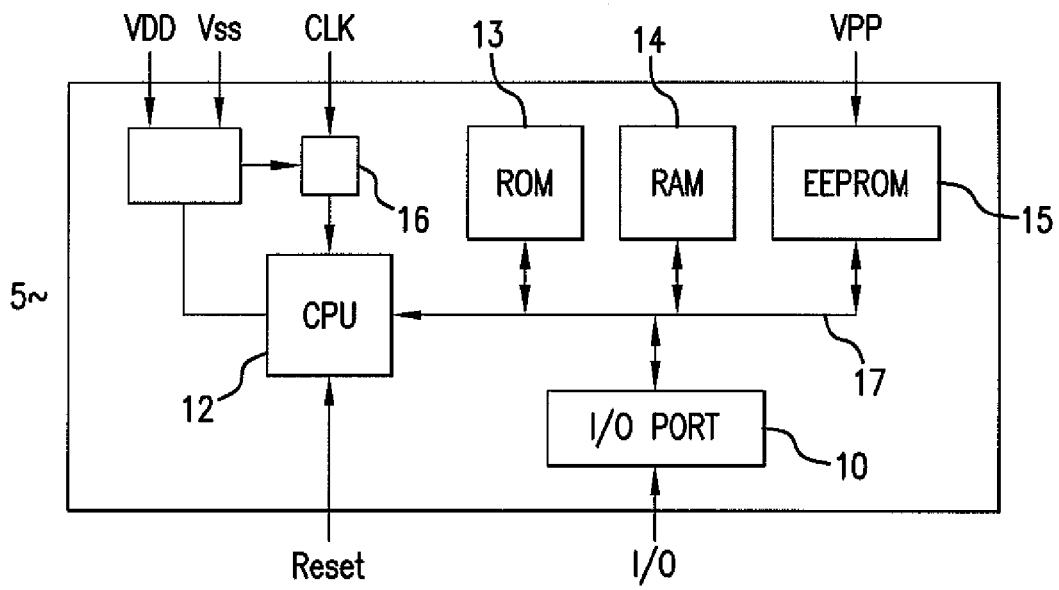
FIG. 2 shows an Integrated Circuit card which may be used with the present invention.
Figure 3:
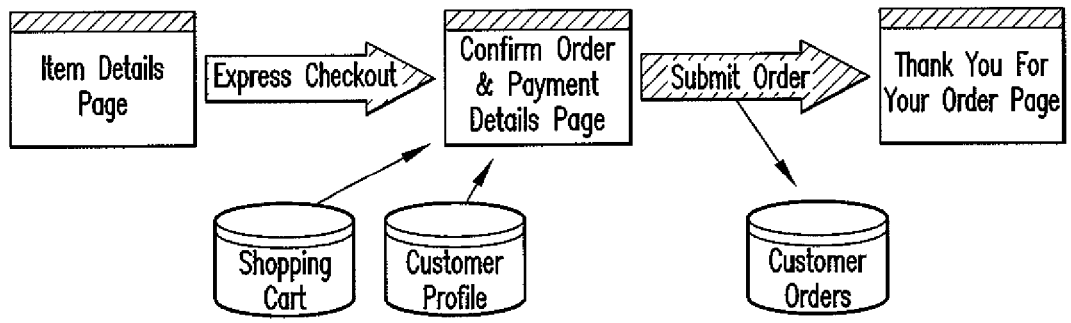
FIG. 3 shows a known Express Checkout Page Flow.
Figure 4:
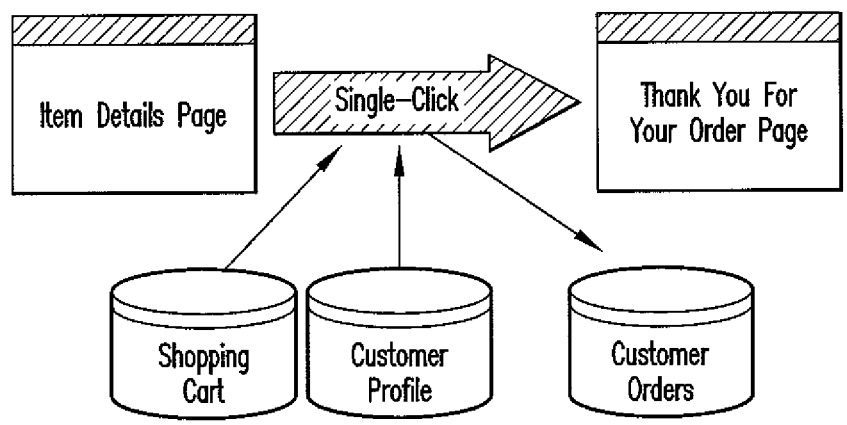
FIG. 4 shows a known Single-Click process flow.
Figure 6:
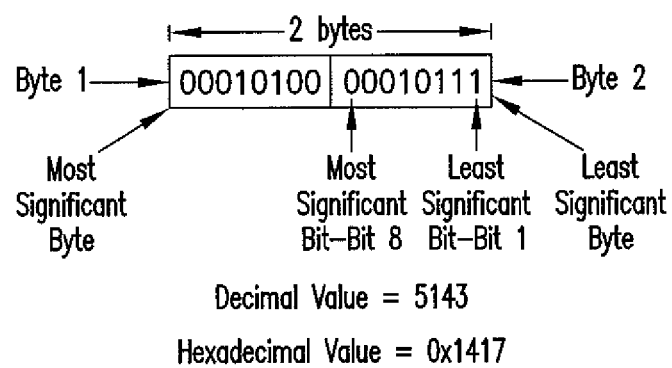
FIG. 6 shows how bytes are described.
Figure 5:
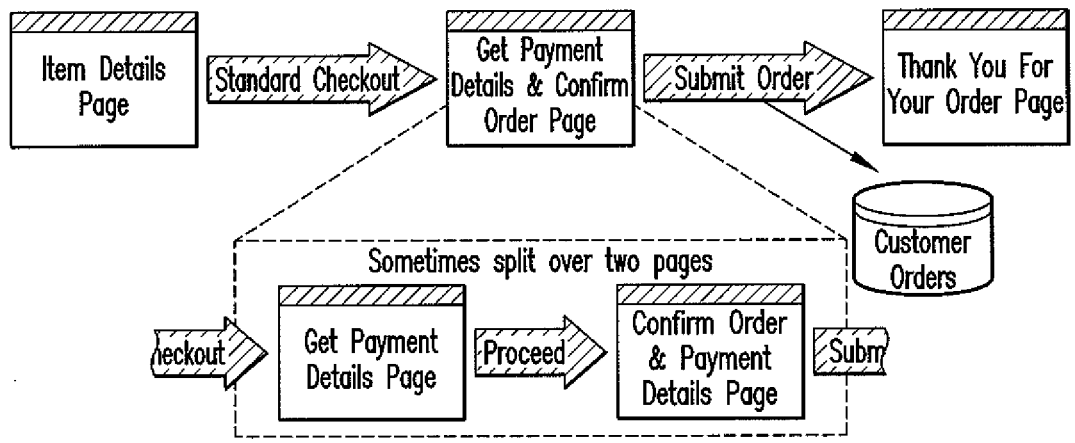
FIG. 5 shows a known standard process flow.

All tables, diagrams and textual references to numbered bytes, e.g. "Byte 1 is transferred," are in the style of references to bytes within a larger block, counting from the start of the block/sub-block. The bytes are not numbered in a most/least significant byte style as for values. At times this will result in the most significant byte of a numeric data element, e.g. Application Transaction Counter, being referred to as Byte 1 and the least significant as Byte 2. Bits on the other hand are identified in the reverse manner where the most significant bit is the "first" bit and is referred to as Bit 8, whilst the least significant bit is the "last" bit and is referred to as Bit 1. See FIG. 6. Where a number is given/illustrated and its number base is not described it shall be assumed to be decimal (Base 10). Where a number is given/illustrated with a leading "0.times." it shall be assumed to be hexadecimal (Base 16).

If examples are used to help illustrate and clarify the text of the specification, and there are any discrepancies between the specification and what appears in the associated example, the specification should always be considered to be the reference.

TERMINOLOGY

AAC Application Authentication Cryptogram
AAV Accountholder Authentication Value
AC Authentication Cryptogram
AFL Application File Locator, identifies what records are available where in the ICC.
AID Application Identifier, the hex string which identifies a given application in the ICC.
AIP Application Interchange Profile, indicates the capabilities of the ICC to support specific functions.
APDU Application Processing Data Unit, the messages sent between ICC and some external application.
ARQC Application ReQuest Cryptogram
ATC Application Transaction Counter
BCD Binary Coded Decimal
Big-Endian An encoding style where a value is stored with its most significant byte first followed by each successive byte, with the least significant byte stored last.
CAP Chip Authentication Program
CDOL Card risk management Data Object List
CID Cryptogram Information Data
CSN Card Sequence Number
CVC2 Card Verification Code
CVM Cardholder Verification Method, the method used to verify a cardholder to the card.
DAC Dynamic Authentication Cryptogram
DOM Document Object Model, the programmatic view of the current HTML page supplied by a browser to a plug-in.
HHD Hand held device, e.g. a card reader
EMV Europay MasterCard Visa
IA Interface Application
IAD Issuer Application Data
IAF Internet Authentication Flags, the first byte of the IIPD.
ICC Integrated Circuit Card, also known as Chipcard or Smartcard.
IIPB Issuer Internet Proprietary Bitmap, identifies bits which may be sent to the Issuer in order to validate the AC.
IIPD Issuer Internet Proprietary Data, proprietary data used by the Issuer in relation to computing a cryptogram for the purposes of Internet related transactions.
ITV Interactive Television
LATC Lower (byte of) Application Transaction Counter
Little-Endian An encoding style where a value is stored with its least significant byte first followed by each successive byte, with the most significant byte stored last.
MAC Message Authentication Code. A cryptographic signature calculated over data items in a message to both prove the origin of the message and to allow detection of whether those data items have been modified.
MCD Main Cardholder Device, the device on which the browsing and/or ordering and/or payment is being performed on.
Nibble Half a byte i.e. 4 bits.
P1 Parameter 1, of an APDU, it effectively customizes the command being sent to the ICC.
PAN Primary Account Number
PC Personal Computer
PCR Personal Card-reader.
Cardholder IA Cardholder Interface Application, the application running on the MCD which interfaces between the authentication requester, the Cardholder and the PCR.
PDA Personal Digital Assistant
PDOL Processing Options Data Object List, the list of processing options available to/supported by the terminal (i.e. PCR).
PIN Personal Identification Number
PINLA PIN Less Authentication
PLA Perso Less Authentication
SPA Secure Payment Application
TLV Tag Length Value
UCAF Universal Cardholder Authentication Field
UN Unpredictable Number The Authentication scheme according to the present invention is a use of the Universal Cardholder Authentication Field (UCAF). This scheme will be referred to as Chip-UCAF for convenience only. The term itself does limit the present invention. The present invention provides secure authentication methods that take advantage of the UCAF infrastructure. It comprises the following elements:

Issuer Provided Chip-UCAF-Enabled interface application
UCAF Accountholder Authentication Value (AAV) generation.
Cardholder authentication.

Merchant presentation, collection and processing of AAV Data in the UCAF Authentication Data Field.

Acquirer acceptance and processing of AAV Data as contained in the UCAF.

Banking network development to include support of carrying the AAV data in the UCAF Authentication Data Field.

Authorization support of AAV data in the UCAF Authentication Data Field.

The following entities are involved in the lifetime of a Chip-UCAF authentication transaction:

Cardholder—The cardholder initiates the transaction and is responsible for entering data into both the merchant's payment web pages, the Cardholder Interface Application, and the Personal Card-reader.

Merchant—The merchant supplies, e.g. from a merchant server in communication with the Internet, the data necessary to start the authentication transaction and receives the resultant UCAF data to forward, via their acquirer, to the card issuer for approval.

Cardholder Interface Application—The Cardholder IA detects the relevant data supplied by the merchant and interacts with the cardholder directly and indirectly, through the cardholder, with the Personal Card-reader. The Cardholder IA creates the AAV and UCAF and populates the merchant's page with the appropriate data. For example, the Cardholder IA can run as part of an Internet browser on the main cardholder device (MCD) being used to access the merchant on the Internet.

Personal Card-Reader—The PCR interacts with the Cardholder, and the ICC to produce an authentication token that is passed, indirectly, to the Issuer.

ICC—the chip card authenticates the Cardholder through the use of submitted PIN verification and generates a suitable cryptogram based on data supplied by the PCR.

Acquirer—An acquirer accepts the formatted UCAF data from a merchant, e.g. at an acquirer server, and forwards it, with an indicator of the use and presence of UCAF data, to the issuing bank via the appropriate telecommunications network.

MasterCard is an acquirer.

Issuer—The card issuer distributes PCRs to those cardholders that are signed up to the Chip-UCAF scheme. The issuer maintains an issuer server platform in communication with the Internet. In accordance with the present invention the Issuer server validates the authentication token encoded into the UCAF, transmitted in the authorization request by an acquirer, according to the rules of that issuer.

In one aspect the present invention provides authentication for e-commerce payment services. Cardholder presence status is provided for transactions that are online to the Issuer. The classical authorization route through the existing payment scheme network can be used. A Personal Card-reader is used operating either as a stand-alone device or connected to/integrated with the Cardholder's access device (e.g. Laptop, PC, pocket PC, smart phone, palm pilot, PDA). The reader preferably has a display and keypad for allowing limited Cardholder interaction. The specifications for the Personal Card-reader should preferably allow a maximum possible number of different card implementations whilst at the same time catering for Cardholder convenience. The Personal Card-reader should preferably have the display capability to show the PIN validation result, and for unconnected devices a token which must be entered by hand on the main cardholder device. The Personal Card-reader must be capable of obtaining from the ICC an indication from the Issuer of the data that must be transferred to them in order to allow the ICC signature to be verified. The Personal Card-reader should preferably be capable of obtaining from the ICC an indication from the Issuer as to whether or not to incorporate the amount and currency of the transaction in the generated token. When such an indication is made the reader must be capable of allowing the Cardholder to enter the amount and associated numeric currency code. Where the transaction amount is to be entered by the Cardholder, it is preferably in a "natural" format, i.e. inclusive of decimal indicator, but converted to ISO 4217 base currency units for inclusion in the card signature. Any such amount entered by the Cardholder, or otherwise communicated to the reader should preferably be displayed along with an associated 3-character currency symbol, e.g. EUR, prior to approval, via PIN, by the cardholder.

The UCAF (Universal Cardholder Authentication Field) data field is a multipurpose data transport area in a digital message to allow communication of authentication data to an Issuer from an Acquirer over any form of telecommunications network. For example, the UCAF can be a 32-character field (24 bytes—1 control byte and 23 data bytes—that are base-64 encoded to become 32 characters) with a flexible data structure that can be tailored to support the needs of a variety of Issuer security and authentication requirements. For example, ISO 8583 Data Element 48, sub-element 43 may be designated to contain the UCAF. The term UCAF also extends to referring to the interface defined to pass data between the Merchant and the MCD and back again, i.e. the field names in the specification for any given channel.

The Accountholder Authentication Value (AAV) is the term given to a part, e.g. the 23 bytes, of UCAF application specific data. Each UCAF application is responsible for determining the appropriate structure for its AAV. Every instance of an implementation of a given UCAF application must use that application's AAV structure in a consistent manner, i.e. the AAV format is standardized for a given UCAF application.

In order to use the Chip-UCAF cardholder authentication scheme the cardholder needs to have an appropriate ICC payment card and a Personal Card-reader. The PCR will be supplied to the cardholder by their card issuer, who will register that that cardholder has a PCR and is "enrolled" in the Chip-UCAF cardholder authentication scheme. The UCAF transaction data supplied by the Merchant is used for display purposes and some of it is used in generating a transaction related PCR Challenge. There is no additional processing that Merchants need to perform on the AAV data within the UCAF response. This is indicated to the Merchant through the UCAF Control Byte value being set to the value for Chip-UCAF. The Cardholder Interface Application (Cardholder IA) provides the interaction between the authentication requirer (Merchant), the cardholder and the PCR. The Interface Application presents the secure face of the present UCAF scheme to the cardholder. It is responsible for presenting the transaction data to the cardholder, generating the challenge transferred to the PCR, receiving the PCR Token response, formatting the UCAF and populating the return data for the given channel. The Cardholder IA has a minimum set of requirements it must meet in order to effect a Chip-UCAF transaction. It may also add additional functionality such as intelligent form filling, receipt tracking/logging, integration with personal finance software etc.

The Main Cardholder Device (MCD) is the device on which the browsing/shopping is probably carried out and, for the scope of this specification/scheme, the payment and authentication process is certainly carried out. The present invention will be described with reference to a PC device on some platform in an Internet browser environment. The Cardholder IA must execute in this environment.

The Personal Card-reader (PCR), is a device to enable PIN entry and validation, e.g. off-line and authentication of transaction context data by a cardholder's ICC inserted in the device, for the purposes of e-commerce transactions. An unconnected PCR may be used with the present invention, i.e. a device that has no physical/electrical connection with any outside system and whose interface for data into and out of the device is the cardholder, via the keypad and display. Personal Card-reader with other types of connection may also be used.

An unconnected PCR device has no physical/electrical connection with any outside system. The interface for data into and out of the device is a keypad a display for interaction with a person, i.e. the cardholder. When using an unconnected device, the cardholder must manually enter, in addition to a PIN, certain data that the PCR will use, in conjunction with the card, in order to generate an authentication value. The authentication value is displayed on the PCR's display for the cardholder to then manually enter into the Cardholder Interface Application. Check digits are used to enable data entry validation.

PCR connected devices allow more data to be transferred to the MCD, without the inconvenience to the cardholder of passing the data manually. Connected devices may be devised which can operate in unconnected mode when the connection cable is removed.

A PCR one-way connected device is connected to the MCD in the out direction only. The interface for data into the device is the keypad. It has a display for interaction with a cardholder. The cardholder again acts as the data transport mechanism between MCD and the PCR. The cardholder must manually enter, in addition to their PIN, certain data that the PCR will use, in conjunction with the card, in order to generate an authentication value. The authentication value is sent out to the MCD through the one-way connection.

A two-way PCR connected device is connected to the MCD in both directions. The device has a keypad for cardholder PIN entry and a display for interaction with the cardholder. The cardholder need only enter their PIN. The MCD can transfer all of the data that the PCR will use, in conjunction with the card, in order to generate an authentication value. The authentication value is sent out to the MCD.

An integrated PCR device is an MCD that has a direct connection to a smartcard reader. The terminology is meant to apply to PDAs with built in smartcard readers, but the technology could equally well be a desktop PC with a directly connected smartcard reader. The cardholder need only enter their PIN. The MCD performs all of the PCR functionality and transfers commands directly to the ICC through the connected reader. The response from the ICC is processed by the MCD itself. The software is written in such a way that the Cardholder IA is able to behave in the same way as for a two-way connected device, i.e. when communication is made out to the PCR by the Cardholder IA, the drivers send & receive the data to & from a PCR that "just happens to be" on the same MCD.

A connected and integrated PCR device would be a self-contained PCR, integrated into the MCD. The requirements for such a device are no different to those for a connected device, and may be integrated into a PC keyboard other input/output device.

In the context of UCAF, the UCAF enabled Acquirer has a relationship with a UCAF enabled merchant. The acquirers enable their merchants to pass the extra UCAF data to the acquiring systems and enable their systems to identify the presence of and pass on supplied UCAF data to the issuing bank.

The Issuer Host, or some other element acting, to the scheme, as the Issuer Host is responsible for taking the data passed in the authorization network message, including the data in the UCAF, and enabling the authentication token to be validated.

Given that the chip based functions described in the present invention essentially provide means of verifying the Cardholder presence to the Issuing bank, the present invention can also be implemented in remote banking environments ("e-" or "m-banking"). This would provide banks with a consistent Consumer authentication method across products, services and environments.

Figure 7:
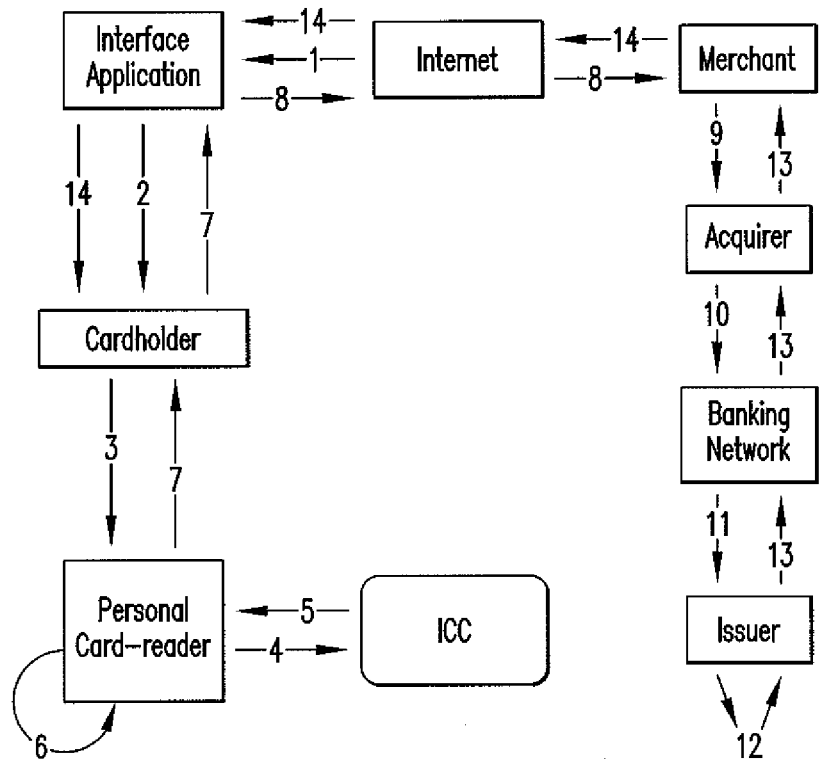
FIG. 7 shows an authentication system in accordance with an embodiment of the present invention.

Chip-UCAF uses the UCAF infrastructure to transport authentication and security data between Cardholder, Merchant, Acquirer and Issuer. FIG. 7 illustrates the process flow for a typical Chip-UCAF transaction in accordance with an embodiment of the present invention. This flow assumes that prior to conducting a transaction, the Cardholder has registered with their Issuer for the service, obtained and initialized the Cardholder Interface Application and obtained a Personal Card-reader that is compatible with their ICC card. It is also assumed the Cardholder has identified a product or service offered on the merchant server and has initiated the checkout process and has already been requested by the merchant to provide payment card details. Once the items are selected and the checkout phase begins, the Cardholder provides billing address, shipping address and payment card details to the merchant. Billing and shipping address information can be entered directly or based on information stored at the merchant for the particular Cardholder. When the merchant requests confirmation and authentication of the order, the merchant's web server provides a series of hidden fields uniquely describing this transaction. For instance, this information may include one or several of Merchant Name
Card Acceptor City
Card Acceptor State/Country Code
Currency Code
Sale Amount
Merchant Transaction Stamp
UCAF Authentication Data Field
Payment Card Number (populated by the merchant with the last 5 digits of the previously supplied card number)
UCAF Brand Referring now to the numbering of FIG. 7, the following is a description of an embodiment the present invention.

1. The Cardholder's Interface Application acquires the merchant identifier information and the transaction data from the UCAF Authentication Page and builds a Challenge that is presented to the Cardholder.

2. The Cardholder inserts the payment card (ICC 5) in the Personal Card-reader.

The application implemented on the Personal Card-reader requests the Cardholder to enter the Challenge or the challenge is transferred automatically thereto. The Personal Card-reader may then extract the sale amount currency and request the Cardholder to enter the sale amount in that currency.

3. The Cardholder may then be invited to enter a personal security code, e.g. a PIN, on the Personal Card—reader as evidence of he/she agreeing to the transaction. The Personal Card-reader may then request the payment card (ICC) to verify the PIN.

4. The Personal Card-reader requests the payment card (ICC) to sign the transaction-related data (i.e. the challenge) using a suitable encryption routine.

5. The ICC returns a cryptogram (MAC) over the transaction data and other ICC specific data that the Card Issuer will need to validate the cryptogram. Methods of signature and/or encryption are known from books mentioned above as well as "Applied Cryptography", B. Schneier, 1996, ISBN 0-471-11709-9, "Understanding Public Key Infrastructure", C. Adams, S. Lloyd, New Riders, 1999.

6. The Personal Card-reader then builds a data token using part of the cryptogram and the variable data identified by the Card Issuer. The Personal Card-Reader may use the IIPB stored on the ICC or a default IIPB to build the data token.

7. The Personal Card-reader formats the data token and presents it to the Cardholder who will enter it at the Cardholder Interface Application either manually or by transmission.

8. The Cardholder Interface Application builds the AAV for inclusion in the UCAF. The Cardholder Interface Application inserts the Chip-UCAF generated for this particular transaction into a hidden authentication data field provided on the Merchant UCAF Authentication Page. The transaction is then submitted for authorization processing by the Merchant.

9. The Merchant submits an authorization request to its Acquirer. The authorization request must include the unaltered Chip-UCAF value that will be verified by the Issuer during authorization processing.

10. The Acquirer accepts the (local) authorization request and creates an Authorization Request Message. This message includes the Chip-UCAF data. The Authorization Request Message is forwarded via a banking network to the Card Issuer. The Acquirer and the Issuer need to agree on the UCAF specifications for any proprietary message format(s).

11. The banking network forwards the Authorization Request Message, including the Chip-UCAF, to the Card Issuer.

12. Upon receipt of the Authorization Request Message, the Card Issuer will perform the following:

a) If the Authorization Request does not indicate that the Merchant was UCAF-enabled (e.g. Security Level Indicator bit set to '0' indicating "UCAF not supported by merchant", see later), the Authorization Request will be processed in a business-as-usual manner by the Issuer's authorization system.

b) If the Authorization Request indicates that the Merchant was UCAF-enabled and the Cardholder is registered for Chip-UCAF service but no Chip-UCAF authentication data is present (e.g. Security Level Indicator bit set to "1" indicating UCAF supported by merchant but not provided by Cardholder", see later), the Issuer must determine whether to approve or decline the authorization. Such a scenario indicates that the Cardholder did not use the Chip-UCAF-enabled Cardholder Interface and Personal Card-reader to process the payment transaction.

c) If the Authorization Request contains UCAF authentication data, the Card Issuer validates the AAV.

13. The Issuer responds with an approval or declines based on the outcome of the previous step. This response is returned to the Merchant, via the same network systems, who will then respond to their customer as appropriate.

14. The Merchant's response to their customer can be in any suitable format, e.g. through an HTML page confirmation for online authorizations, and via e-mail for batch authorizations.

The security of Chip-UCAF relies on certain security features. More specifically, Chip-UCAF may rely on the generation of cryptograms by the ICC, namely the Application Request Cryptogram (ARQC) or the Application Authentication Cryptogram (AAC), to establish:

proof of cardholder presence, and

A proof of transaction approval by the cardholder.

In addition, it offers a protection against the replay of genuine transactions and against the generation of fake Chip-UCAF transactions. Therefore, when used in conjunction with suitable security measures, especially related to PIN security, Chip-UCAF offers an adequate level of security to enforce the non-repudiation by the cardholder of Internet transactions.

The assessment of the level of security offered by Chip-UCAF is based on the following assumptions:

The Main Cardholder Device (MCD), i.e. the platform used by the cardholder for performing the actual payment operation, is considered trusted. This applies to the physical device, e.g. a PC or a mobile phone, to the Interface Application (IA) generating the challenge and to the application communicating with the Personal Card-reader when relevant. Because of the uncontrolled nature of the MCD, this assumption is perceived valid for any similar product.

The security of sensitive payment details, e.g. PAN or expiry date, entered at the MCD and sent to the merchant is outside the scope of this product. The confidentiality of this data should be enforced by encryption of the link between the MCD and the merchant, e.g., by relying on SSL encryption, and by the protection of the card details on the merchant host system.

The ICC may establish the proof of cardholder presence through the use of a validation, e.g. an off-line PIN validation. Off-line PIN validation may be required prior to the generation of an ARQC. If off-line PIN validation is required, cardholder presence is required to generate a valid ARQC, and the existence of such a valid cryptogram is sufficient to demonstrate this cardholder presence.

However, this is not the case for the generation of the AAC, which does not mandate an off-line PIN validation. In order to establish proof of cardholder presence, the issuer relies solely on the CVR transmitted within the challenge response. Card Verification Results (CVR) refers to any information transmitted from the card. It may include information allowing the issuer to check whether or not the cardholder PIN has been correctly verified by the card. It is important to protect the integrity of the CVR during transmission.

This property is ensured when the ICC includes the CVR into the AAC calculation input data. However, such behavior is not mandatory. It should be understood that those ICCs that do not include the CVR into the ARQC or AAC calculation input data could be used without PIN for Internet transactions. Consequently, such ICCs should preferably not be used in the frame of the Chip-UCAF program.

Chip-UCAF uses a digest of the transaction description as input to the ARQC or AAC calculation. This digest is used as the UN field from the input parameters to the ARQC or AAC calculation. A successful validation of the cryptogram by the Issuer, combined with the proof of cardholder presence, provides some assurance on the approval of the transaction by the cardholder.

In order to ensure that the transaction description is actually taken into account, the ARQC or AAC calculation must effectively use the Unpredictable Number (UN). However, such behavior is not mandatory. Consequently, those ICCs that do not include the UN into the ARQC or AAC calculation input data should preferably not be used in the frame of the Chip-UCAF program.

In order to ensure protection against replays of genuine transactions, two conditions should be fulfilled:

The ATC as received from the ICC must be checked against the last received ATC for that particular ICC. Transactions using an already received ATC should be discarded.

The ARQC or AAC generated by the ICC must vary as a function of the ATC. This is the case only when the ATC is included into the input data to the ARQC or AAC calculation. However, such behavior is not mandatory. Therefore, those ICCs that do not include the ATC into the ARQC or AAC calculation input data should preferably not be used in the frame of the Chip-UCAF program.

The main security issue associated with the use of a Personal Card-reader device is the risk of disclosure of the card PIN or of card-stored sensitive information, such as ISO2 track, by the device itself Fraudulent or tampered Personal Card-readers may endanger the confidentiality of the PINs or ISO2 track. The level of risk depends on the type of device:

The stand-alone nature of the unconnected Personal Card-readers requires these devices to be physically accessed by malicious parties wanting to gain access to confidential information. Only small-scale attacks are feasible on such devices and therefore the impact of such attacks is expected to be low.

One-way or two-way connected Personal Card-readers offer more fraud possibilities, due to the presence of a physical connection. Large-scale attacks could be feasible on such devices and therefore, the impact of such attacks is expected to be higher.

Integrated Personal Card-readers provide even more flexibility in terms of transparent communication with the external world, offering additional potential for fraud.

Also, the ARQC or AAC as returned by the ICC need not transferred completely to the Issuer. They can be truncated as specified by the IIPB and so the IIPB must be defined in such a way that a certain number of bits, e.g. at least 16 bits, from the ARQC or AAC are included into the data token returned by the Personal Card-reader. Because of the reduced size of the truncated cryptograms, fraud detection systems should be in place to detect abnormal numbers of failed cryptogram validations and take any appropriate action.

The ARQC or AAC should be validated by the Issuer on the basis of the information provided by the merchant. That is, in the verification process, the issuer should build the challenge from the original input data rather than relying on a challenge provided by the cardholder device. This requires that the input data is sent to the Issuer from the merchant as well as the special authentication token in accordance with the present invention.

A card used to calculate the Application Cryptogram (ARQC or AAC) must use the CVR as input to the calculation. Cards which do not so must not be used for Chip-UCAF authentication. A card used to calculate the Application Cryptogram (ARQC or AAC) must use the UN as input to the calculation. Cards which do not so must not be used for Chip-UCAF authentication. A card used to calculate the Application Cryptogram (ARQC or AAC) must use the ATC as input to the calculation. Cards which do not so must not be used for Chip-UCAF authentication. Issuers should ensure that an ATC is not reused.

Issuers should ideally employ fraud detection systems to detect and act on abnormal numbers of failed cryptogram submissions.

The Issuer should rebuild the challenge data for verification of the cryptogram from the authorization message, rather than rely on that supplied by the Cardholder's software in the UCAF itself.

Figure 8:
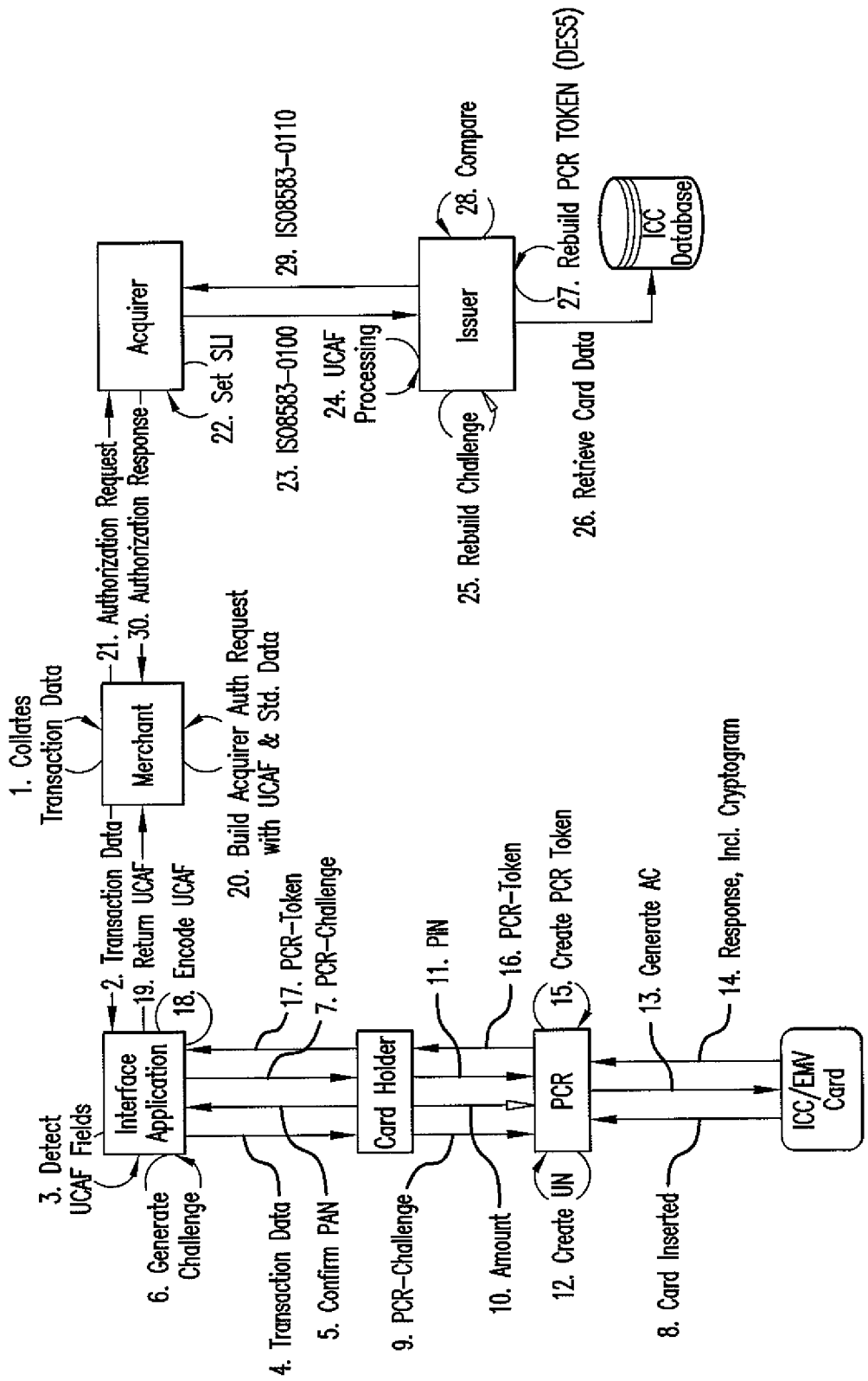
FIG. 8 a more detailed flow of an authentication system in accordance with an embodiment of the present invention.

FIG. 8 shows detailed PCR and Chip-UCAF Flows in accordance with an embodiment of the present invention. This diagram and following text serve as illustrations only of an embodiment of the present invention and of the steps involved in the Chip Authentication Program, starting from the point where the Merchant supplies the UCAF Merchant Data on a UCAF Authentication Page to the point where the Merchant receives the Authorization Response from their Acquirer. Further, the particular order of some steps is arbitrary or rather not compulsory, e.g. Card Inserted at step 8.

For the purposes of this embodiment it is assumed that the Main Cardholder Device is a PC running a standard browser, and that the UCAF Merchant Data is presented in hidden HTML form fields. This embodiment assumes that an unconnected PCR is used. Where an unconnected or one-way connected device displays a prompt to the Cardholder to enter some data, not including PIN entry, the two-way connected or integrated device must request to the Cardholder IA that the same element of data be passed to it. However the precise mechanics of this communication protocol are proprietary to any implementation.

Confirmation of the Authorization from the Merchant to the Cardholder is not excluded from this invention.

In FIG. 8 it is assumed that the Merchant has already collected the payment details, including PAN, Expiry Date, etc. and is at the stage in the order processing pipeline where the order and payment details can be finalized through a UCAF Authentication Page. The Cardholder has already personalized his/her Cardholder IA with details of the PAN so that when the last 5 digits of the PAN being used for this payment are presented in the UCAF field, the Cardholder IA is able to recognize if it can act on behalf of that PAN.

Referring to the numbering of FIG. 8:

1. Collate Transaction Data—The Merchant collates the transaction-related data required as per the UCAF specification.

2. Send Transaction Data—The Merchant transmits the transaction data through the mechanism defined for the given e-commerce channel, as defined by the UCAF specification for that channel.

3. Detect UCAF Fields—The Interface Application (IA) installed on the Main Cardholder Device (MCD), detects the presence of the UCAF hidden fields, determines that a number, e.g. the last 5 PAN digits supplied by the Merchant relate to a PAN already known to the IA, validates the remaining UCAF data and presents itself.

4. Display Transaction Data—The IA displays the transaction-related data to the Cardholder through its user interface. The Cardholder may decide at this point to reject the transaction.

5. Confirm Card Details—The Interface Application may request the Cardholder to confirm that the card details it has selected are correct. This may take the form, for example, of reminding the Cardholder which card to physically use in the PCR, e.g. perhaps through the use of a "friendly" identifier the Cardholder associated with the particular card when personalizing the Cardholder IA with the card details.

6. Generate Challenge—The Interface Application causes the PCR Challenge to be generated from certain transaction data+PAN.

7. Display PCR Challenge—For unconnected or one-way connected devices, the Interface Application displays the challenge, which must be entered into the PCR by the Cardholder.

8. Card Inserted—The Cardholder inserts the ICC 5 into the PCR.

9. Transfer PCR Challenge—The PCR Challenge is transferred to the PCR. For an unconnected or one-way connected device, the Cardholder does this by entering the challenge into the PCR, in response to the prompt from the Interface Application and the PCR itself Otherwise it can be transmitted to the PCR.

10. Optional: Transfer Amount—Where the authentication scheme requires an amount and currency, the amount is transferred to the PCR. For an unconnected or one-way connected device, the Cardholder does this by entering the amount of the transaction into the PCR, in response to the prompt from the PCR. Otherwise it can be transmitted to the PCR.

11. Enter PIN—The Cardholder may enter a security or validation code such as a PIN at the PCR or the MCD, in response to prompting from the Interface Application and/or the PCR itself 12. Create UN—The PCR creates the Unpredictable Number.

13. Generate AC—The PCR constructs and sends a Generate AC command to the card.

14. Response, incl. AC—The card returns an AC, amongst other data, as the response to the PCR.

15. Create PCR Token—The PCR "strips down" the response, based on the Issuer specifications found in the IIPB, to create the PCR Token. The IIPB may be stored on the ICC and transmitted to the PCR in step 14. Alternatively, the IIPB may be a default IIPB stored on the PCR.

16. Display PCR Token—The PCR displays the decimal numeric token to the Cardholder.

17. Transfer PCR Token—The PCR token is transferred from the PCR. For an unconnected device, the Cardholder does this by entering the PCR Token into the Interface Application, in response to the prompt from the Interface Application and the display on the PCR. Otherwise it can be transferred automatically.

18. Encode UCAF—The Interface Application encodes the Chip-UCAF structure, sets the UCAF Control Byte and then Base64 encodes it for transmission in the UCAF.

19. Return UCAF—The Interface Application codes the various return data items into the Merchant payment request communication.

20. Build Authorization Request—The Merchant extracts the data supplied by the IA in the hidden fields returned to the Merchant and builds up the proprietary authorization request to their Acquirer.

21. Authorization Request—The Merchant passes the authorization data, including the UCAF to their Acquirer, who passes it on to the appropriate Issuer.

22. Set SLI—The Acquirer sets the Security Level Indicator (SLI) as appropriate for the authorization transaction.

23. ISO 8583-0100—The Acquirer forwards the Authorization Request to the Issuer who then performs some initial standard processing on the message.

24. UCAF Processing—The Issuer checks for the presence of UCAF.

25. Optional: Rebuild Challenge—The challenge to the PCR is recreated from the message data to allow the Unpredictable Number to be regenerated.

26. Retrieve Card Data—The Issuer must retrieve certain data elements from the ICC database in order to be able to rebuild.

27. Rebuilding—The PCR token is generated by the Issuer, based on the knowledge of the algorithm used by the PCR.

28. Compare—The Issuer compares the reduced PCR Token in the Authorization message with the PCR Token generated from the input data. This may involve changes to a "security box," where it handles comparison.

29. ISO 8583-0110—The Issuer sends the Authorization Request Response to the Acquirer.

30. Authorization Response—The Issuer returns the authorization response, via the Acquirer, to the Merchant.

Steps 1 to 21 are specific to this scheme;

The Merchant collating and presenting the transaction data in a particular, specified format.

The Cardholder's main access device, Cardholder Interface Application, the PCR and the Cardholder themselves causing the PCR Token to be generated and returned to the Merchant.

The Merchant passing new data into the existing Acquirer communication.

Step 22 shows extra steps an acquirer must take when handling UCAF data;

The Acquirer is responsible for setting the Security Level Indicator depending on the data supplied by the Merchant.

Step 23 is a summary of the existing transmission of payment data to the Acquirer and then on to the Issuer, via the ISO 8583-0100 Authorization Request message;

On receipt of the 0100 message the Issuer must perform a small step to determine if there is any data in the UCAF and processes it appropriately.

Steps 24 to 28 are specific to this scheme;

The Issuer extracts the data from the UCAF and verifies the PCR Authentication Token.

Steps 29 and 30 are a summary of the existing ISO 8583-0110 Authorization Request Response message and response to the Merchant;

The Issuer, satisfied that the PCR Token is valid, returns an 0110 message to the Merchant, via the Acquirer.

This detailed flow diagram and description show a solution that is independent of the e-commerce channel involved. Steps 2 and 19, the link between the Interface Application and the Merchant Systems, are the points at which there is a dependency on the specifications for a given e-commerce channel.

In accordance with an aspect of the present invention different channels can be used and will require different Issuer software, in the form of the Interface Application, and probably different, but necessarily standardized merchant interaction, e.g. HTML forms, XML data exchanges, etc. However, data content, algorithms and flows remain the same across different channels.

In the above scheme the Merchant supplies details about themselves and the transaction.

In summary these data elements are selected from;
Merchant Name
Merchant City
Merchant State/Country Code
Currency Code
Sale Amount
Merchant Transaction Stamp
UCAF Brand
Payment Card Number (Last 5 digits)

One card specific data which may be used in methods according to the present invention is the Issuer Internet Proprietary Data (IIPD). The Issuer Internet Proprietary Data (IIPD) is a data object whose presence on a card is optional. It is unrelated to the similarly named Issuer Internet Proprietary Bitmap (IIPB), except for its introduction due to the Chip Authentication Program. It contains data that the Issuer chooses to use in a proprietary manner, nominally in conjunction with the generation of the cryptogram when used in the Internet environment, although it may also carry other or alternative data. For example, the transfer of a Card Sequence Number (CSN) to the Issuer may be required. This is static for a given card and can be passed to the Issuer by encoding it into the IIPD. This CSN can be passed in the lower nibble of the first IAF "byte." This technique saves on cardholder data entry. Its use is literally proprietary to an Issuer.

The first byte of the IIPD carries a set of generic flags, predominantly for use by the Personal Card-Reader (PCR). Table 1 provides a schematic indication of these.

TABLE 1

IIPD Flag-Byte Settings

| Bit | Description | Set to 1 | Set to 0 | Default |
|---|---|---|---|---|
| 8 | Amount and Currency Indicator | Amount and Currency Explicitly Used in AC Generation. | Amount and Currency Not Used and so default values are used in AC Generation. | 0 |
| 7 | Cryptogram Type | ARQC Requested in First GenerateAC. | AAC Requested in First GenerateAC. | 1 |
| 6 to 1 | Not Used | N/A | N/A | 0 |

When Bit 8 is set to 1, it signifies that the Issuer requires that the transaction amount and currency must be used when generating the AC. For the PCR this means it prompts/requests the Cardholder/Main Cardholder Access Device (MCD) to supply the currency and amount and for the Interface Application (IA) that the amount and currency need to be supplied. When Bit 8 is set to 0, default values for the amount (0) and currency (999—Code used for transactions with no currency involved) will be used when generating the AC. When Bit 7 is set to 1, it signifies that the Issuer requires that the type of cryptogram to be requested from the card is an ARQC. When Bit 7 is set to 0, it signifies that the Issuer requires that the type of cryptogram to be requested from the card is an AAC. IIPD data beyond the first byte is free for a use which is proprietary to the Issuer.

The IIPD is an optional structure, since its contents may not be required by a given chip implementation in order to generate cryptograms for Internet associated use. However since it contains indicators which instruct the PCR on how to proceed with processing, if it is not present then the PCR must rely on a default setting. If the card has no IIPD, then a default byte value of 0.times.40 can be used, e.g. "No transaction amount and currency, ARQC to be generated."

The IIPD must be transmitted to the Issuer in the Accountholder Authentication Value (AAV). However it is preferably not transferred to the Cardholder Interface Application (IA) by the PCR since this would place too large a data transfer burden on the Cardholder, for unconnected devices. Since the IIPD is static for a given card, it can be supplied to the Cardholder IA in the same manner as the PAN and other static card data are supplied to the Cardholder IA.

Furthermore, the Cardholder IA must know the IIPD, or use the default value, e.g. 0.times.40, in order to determine whether or not the currency and amount need to be transferred to the PCR. The currency information can be transferred as part of the PCR Challenge.

Due to both the data space limitations imposed by UCAF compliance, and the need, at least for some Issuers, to use an unconnected or one-way connected device, the data that the device must transfer back to the MCD is size-limited. Therefore, only a selected portion of the data required by the Issuer to re-compute the AC, generated in response to the GenerateAC command sent to the ICC, is preferably transferred.

The response, by the ICC, to the first GenerateAC command is made up of the following elements;
    Cryptogram Information Data (CID)
    Application Transaction Counter (ATC)
    Cryptogram computed by the ICC (AC)
    Issuer Application Data (IAD)

They contain data that is either;
    Unique to this transaction and must be transferred from the PCR to the Cardholder device by the Cardholder.
    Assumed to be particular values for this particular scheme and so need not be transferred from the PCR to the Cardholder device by the Cardholder.
    Unique to this transaction or ICC and known or at least deducible by the Issuer Host, via its card database and so need not be transferred from the PCR to the Cardholder access device by the Cardholder.

Figure 9:
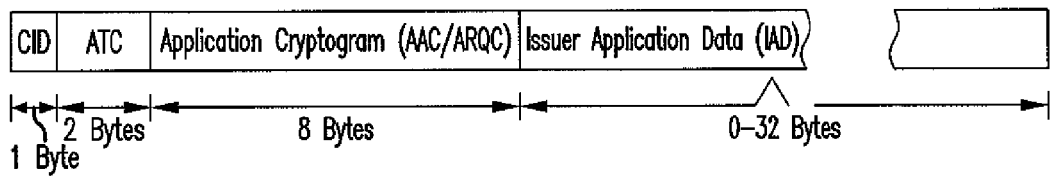
FIG. 9 shows an IIPB Data Structure in accordance with an embodiment of the present invention.

The Issuer Internet Proprietary Bitmap (IIPB) is a data object whose presence on a card is optional. The data consists of transmit flags indicating which bits in the GenerateAC response are required by the Issuer Host system. The flags correspond on a bit for bit basis to the bits that must be sent from the CID (e.g. 1 byte), ATC (e.g. 2 bytes), AC (e.g. 8 bytes) and IAD (e.g. 0-32 bytes) (see FIG. 9). An IIPB can vary in length, e.g. from 11 bytes, where no IAD is defined to 43 bytes where an Issuer's application technology uses the full 32 bytes available to the Issuer Application Data (IAD).

The IIPB allows the Issuer to be completely selective as to which and how many bits of these values it will use for the purposes of validating the authentication thus removing the need for the PCR itself to be aware of, and thus specific to any particular card technology. The IIPB can be used as a bit-mask which allows the PCR to build up a token which will be incorporated into the AAV by the Cardholder IA and passed to the Issuer.

An Issuer can define an IIPB that will mark the minimum possible bits that they will require to verify the cryptogram. The number of bits marked as being required determines the potential size of the data token produced by the PCR.

The IIPB is an optional structure. However since it is used to identify the bits that the PCR must extract and compress, if it is not present then the PCR must rely on a default setting. The default IIPB can be, for example, a 19-byte structure. The result of this is 35 bits of data being sent to the Issuer and requires 11 decimal digits to represent it on the display of the PCR. Adding on the final check digit the default IIPB results in a 12-digit token to be entered by the Cardholder.

The default IIPB may be a single default bitmap stored on the PCR. Alternatively, the default IIPB may be chosen from a number of bitmaps which are stored on the PCR by means of an IIPB selection mechanism. One embodiment of the IIPB selection mechanism will be described herein with relation to a PLA reader.

Issuers can specify an IIPB appropriately for an application technology. This IIPB will then need to be included in the personalization specifications for that application in order that the PCR uses the IIPB stored in the card rather than the default IIPB stored in the PCR.

If an Issuer feels comfortable that, or requires that, there will be a one-to-one match between their issued cards and the PCR used to create the token, then they may change the default IIPB in those particular readers to a personalized IIPB, such that the PCR would be personalized to a single card. This would mean that an IIPB need not be required to be stored in the card. While such cards could be used with personalized PCRs, they may also be used with PLA readers.

The data which is sent to the Merchant from the Cardholder's browser can consist of just the UCAF Authentication Data Field for each browser channel.

Figure 10:
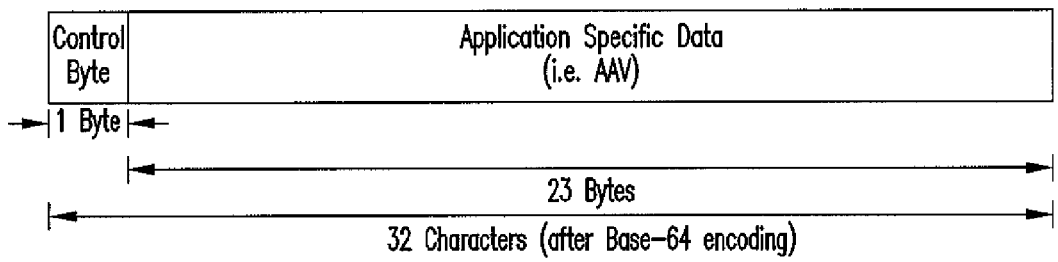
FIG. 10 shows a UCAF Structure in accordance with an embodiment of the present invention.

The UCAF can contain a 24-byte user authentication token. These 24 bytes are preferably encoded, e.g. Base64 encoded, by the Cardholder IA to give 32 ASCII characters of data that are returned to the Merchant. The Merchant passes the UCAF data, in their proprietary communications with the Acquirer who can then populate the UCAF in the Authorization Request message sent to the Issuer. The generic structure of the UCAF is illustrated in FIG. 10.

The UCAF Control Byte is a 1-byte value, which indicates what type of data the UCAF is being used to transport. The following values can be used for UCAF Control Byte encoding;

A first value such as 0.times.82—SPA-UCAF, using a wallet server

A first value such as 0.times.88—Chip-UCAF, using an ICC.

Where the Merchant needs to retransmit an authorization, either due to a previous decline, or for split shipments, the top bit of the UCAF Control Byte must be cleared, leading to the following values;

A third value such as 0.times.02—Subsequent SPA-UCAF Authorization, using wallet server A fourth value such as 0.times.08—Subsequent Chip-UCAF Authorization, using chip The present invention includes other authentication techniques, such as biometrics, and in such a case the specific technique would be assigned its own Control Byte value and the structure of the Application-Specific Data would be tailored to support a biometrics authentication approach. In this case, all biometrics authentication applications should use a consistent Application-Specific Data structure.

Figure 11:
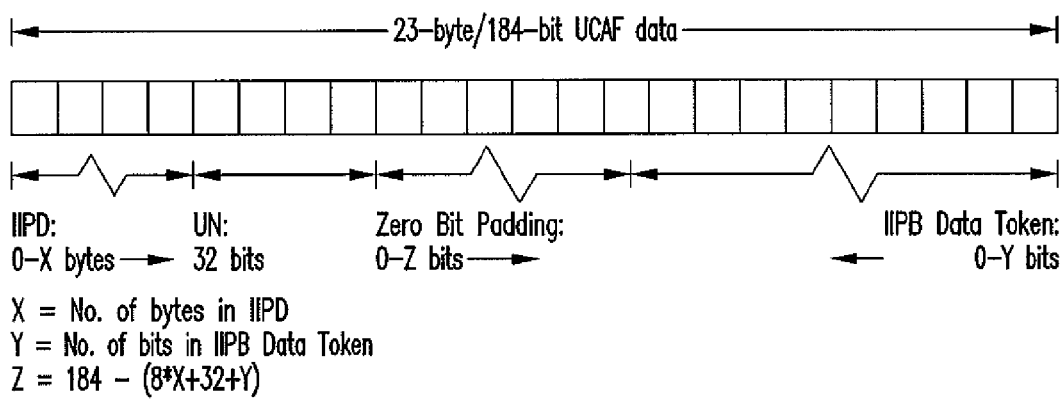
FIG. 11 shows encoding of an AAV in an embodiment of the present invention.

Accountholder Authentication Value (AAV) is shown schematically in FIG. 11. The following data is transferred to the Issuer in the UCAF:

IIPD—Optional, variable in length, but always a multiple of bytes. It may contain a Card Sequence Number, e.g. 4 bits defined by Issuers to be at an Issuer defined position in the IIPD for that card.

Unpredictable Number, e.g. 32 bits (4 bytes) in length

IIPB Data Token, as encoded in the PCR Token—Unknown length, number of bits determined by the IIPB.

The length is preferably restricted, e.g. to a first maximum number of bits such as not to be greater than 184, since, ideally, the Issuer should not supply an IIPB, which when combined with the IIPD could result in more than a second maximum number of bits, e.g. 152 bits (Max data area—Length(UN)) needing to be transferred. As a precaution, the Cardholder IA can ensure that any operation resulting in more than the first maximum, i.e. >184 bits, will result in an error and the data will not be encoded.

There need not be an indication built into the encoding of the AAV for Chip-UCAF to indicate whether or not there is any IIPD data present. It is up to the Issuer to ensure that their host system knows what to expect in the AAV. The encoded inclusion of any IIPD by the Cardholder IA is dependent on whether any IIPD is associated with the payment card used by the Cardholder for the particular transaction.

The UN encoded into the AAV for Chip-UCAF can be a full 4-bytes in size, which is the same size as the UN sent to the ICC in the GenerateAC command. The magnitude of the UN can be altered within its full range, e.g. either increased or potentially even decreased without affecting the data transportation format.

A UN range-limitation can be a result of limiting the number of digits a Cardholder is required to enter to transfer data to the PCR from the MCD. For compatibility reasons this limitation can be applied to both connected and unconnected devices unless there is another indication of the size of the PCR Challenge presented to the PCR.

Figure 12:
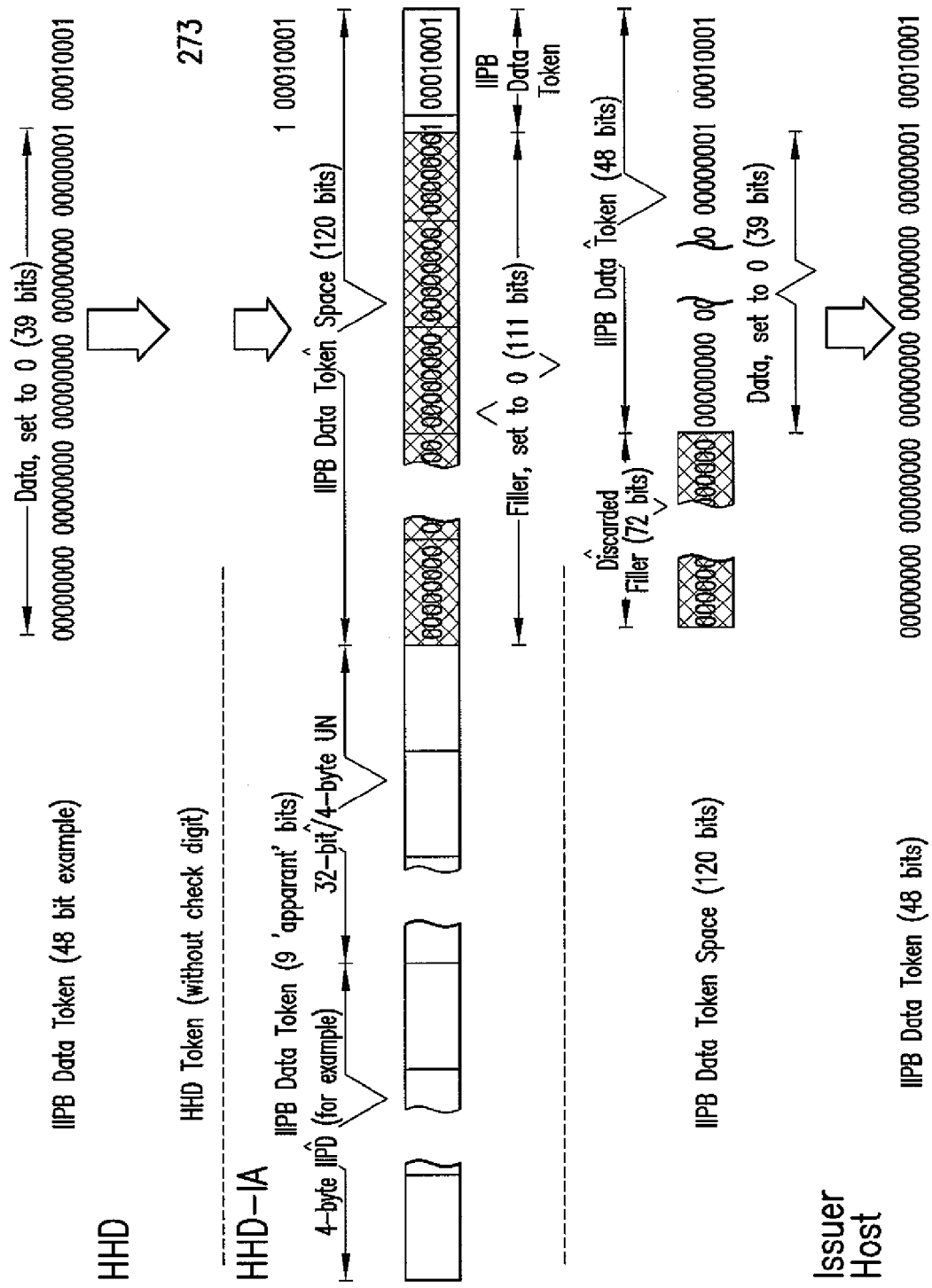
FIG. 12 shows 'Filler Set to 0' vs. 'Data Set to 0'.

The Issuer knows the length of both the IIPD and the IIPB Data Token. The Cardholder IA knows the length of the IIPD, however it does not know the length of the IIPB Data Token and so it should preferably right justify the bits, i.e. least significant bit appears in last bit position, using 0 filler, as illustrated in FIG. 12. As a consequence, any left justified IIPB Data Token data not passed in the PCR Token, because it was set to 0 and therefore did not figure in the numeric token derivation, will be set to the 0 value it represented. This is because the Cardholder IA will have first zeroed out the full 23-bytes of the AAV, resulting in all the remaining bits from the leftmost set bit of the transferred PCR Token back up to the UN having the setting of 0. Some of these bits will represent the 0 value they have in the IIPB Data Token whilst the remainder will just be 0 filler.

Although the Cardholder IA will not know which bits represent data set to 0 and which filler also is set to 0, it does not matter since the Issuer will know which bits are data, since it knows the effective length of the IIPB.

The link between the Merchant and Acquirer can be proprietary, however the Merchant should preferably transfer the following additional data to the Acquirer;

UCAF Authentication Data Field

Error Status Indicator

The Issuer receives the Authentication Request message through the authorization network from the Acquirer. It will contain the standard authorization data in addition to a modified Security Level Indicator (SLI) and the UCAF authentication data. The Authentication Request message contains the SLI which has been extended for use with UCAF transactions.

To improve the accuracy of cardholder data entry a single trailing check digit can be used. The inconvenience of entering an additional digit is outweighed by the value of the validation check this extra digit imparts. The algorithm used for the check digit can be any suitable check algorithm such as the "Luhn Formula", also known as "Modulus 10" as used to validate a PAN. The check digit can be applied to the n-digit PCR challenge, e.g. requiring the cardholder to enter a certain number of digits, e.g. 8 digits for a 7-digit challenge. The Personal Card-reader validates the check digit and informs the cardholder when an incorrect value is entered. If a combined UN/Currency number is used, the check digit shall apply to the complete "number." If an incorrect value is entered, the device shall preferably not abandon or restart the process, but can wait/prompt for the PCR challenge to be entered again. If desired a limit or no limit can be placed on the number of invalid PCR challenge entry attempts.

For an unconnected device, the check digit is preferably applied to the displayed n-digit PCR token, e.g. requiring the cardholder to enter onto the MCD, a certain number of digits such as 13 digits for a 12-digit PCR token. The Personal Card-reader shall compute the check digit and apply it at the end of the displayed PCR token.

For a one-way connected device, the check digit should also be applied since the one way communication does not allow for handshaking verification of data transmission. The Cardholder IA must verify the check digit for these devices and report an error to the Cardholder if one is detected. This would result in the transaction with the PCR needing to be repeated.

The check digit is a transmission-medium error-detection mechanism. For communication in either direction between an MCD and a two-way connected/integrated device, the underlying transmission protocol may also correct any errors relating only to the transmission.

The PCR Challenge is passed to the Issuer. The PCR Challenge consists of one or more parts, e.g. 2 or 3 parts, for example depending on whether the transaction amount is required in the GenerateAC command:

Unpredictable Number (UN)
Optional Currency Code

One or more check-digits such as the Luhn check digit mentioned above

The PCR Challenge is used to create the Unpredictable Number (UN). The PCR will supply the UN to the ICC as part of the GenerateAC command. The UN can be supplied as a full 32-bit structure, containing the value obtained from the Cardholder IA. The range of this value is preferably limited. The magnitude of this range can be determined by the maximum number of digits it is deemed acceptable for the Cardholder to key into an unconnected device. The term 'unpredictable' refers to the fact that the number is unpredictable to the ICC, not that it is unpredictable to an application supplying the value to the ICC, or any other entity outside of the card.

The PCR Challenge is preferably a decimal number with a certain number of digits, which must be transferred to the PCR. As well as the UN, it can also consist of an additional trailing check digit and an optional currency code. Thus for the unconnected and one-way connected devices, where the Cardholder transfers the challenge manually, the number of digits to enter is an issue of Cardholder convenience, or rather inconvenience. For other types of connected devices the challenge can be passed directly and therefore the number of digits used is not an issue. However, since the Issuer will and should be unaware of the type of device used by the Cardholder for a particular transaction, for reasons of interoperability, all Cardholder IAs preferably use the same maximum number of digits to represent the possible range of the UN.

The number of digits can be limited, e.g. up to 8. The PCR can be unaware of this "restriction" as the UN part of the PCR Challenge is simply a value that must be able to fit into the 32-bit UN structure.

In a scheme where the Issuer requires that the PCR incorporate the amount and currency in the GenerateAC command used to generate the AC (e.g. as indicated by the IAF flag setting in Byte 1 of the IIPD), the PCR can require that the amount and currency be transferred to it. In order to reduce the confusion to the cardholder that could arise when transferring a 3-digit currency code to an unconnected or one-way connected device, the code can be incorporated onto the end of the UN passed in the challenge. Thus, when the check-digit is accounted for, a cardholder enters a total of a 12-digit challenge when the scheme requires amount entry.

In summary the sources of the PCR challenge can be:
Transaction Amount
Transaction Currency
Merchant Name
PAN The mechanism used to generate the PCR Challenge must be interoperable since the Issuer will need to reproduce the same actions on the host system where the UN is checked for validity against the source data.

The amount, as supplied by the Merchant in the UCAF data fields and as displayed to the Cardholder, is preferably encoded, e.g. BCD encoded, right justified and zero padded into 6 bytes.

The currency, as supplied by the Merchant in the UCAF data fields and as used in a currency lookup to display the alphabetic code to the Cardholder, is preferably encoded, e.g. BCD encoded, right justified and zero padded into 2 bytes.

The transaction amount and currency are preferably always used in the calculation of the Unpredictable Number part of the PCR Challenge, regardless of the IAF setting (bit 8) for using amount and currency. That flag determines whether the amount and currency are additionally and explicitly used in the cryptogram calculation and with regard to the challenge only affects whether the challenge is used as the transfer mechanism for the currency code from the Cardholder IA to an unconnected Personal Card Reader.

The Merchant name, as supplied by the Merchant in the UCAF data fields and as displayed to the Cardholder, is converted from the 22 Unicode two-byte characters received from the Merchant into 22 one-byte ASCII characters. This can be done by taking away each 'odd' byte—the first byte in each of the 22 two-byte Unicode sequences.

The PAN should be encoded, e.g. BCD encoded, into the smallest number of bytes, and where an odd number of PAN digits is supplied, e.g. a 19-digit Maestro PAN, it should be right justified and zero padded. The inclusion of the PAN in the challenge generation requires that the Cardholder IA has knowledge of the full PAN being used by the Cardholder for this transaction.

Figure 13:
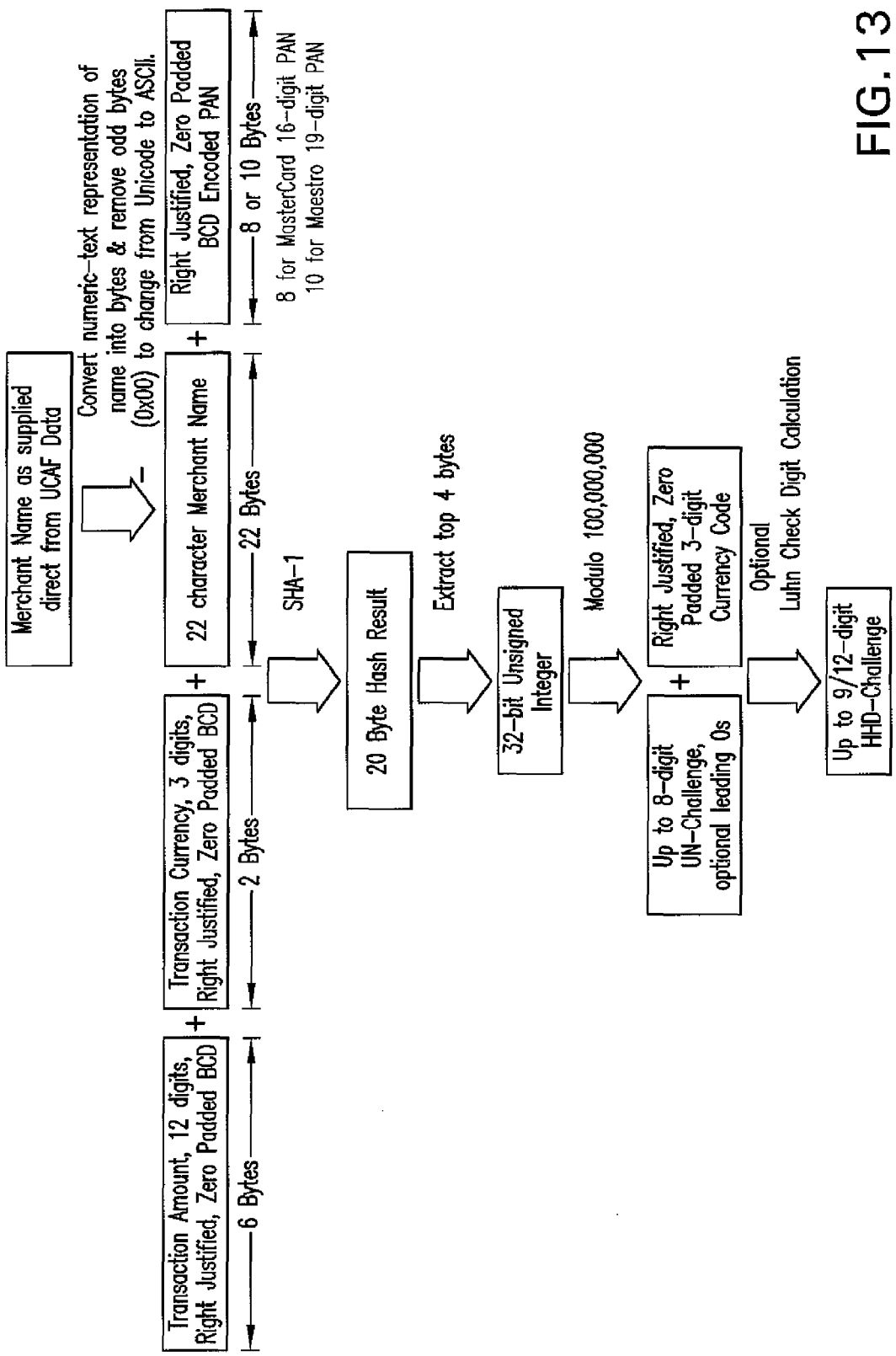
FIG. 13 shows a process flow to form a PCR challenge in accordance with an embodiment f the present invention.

A suitable encryption algorithm is applied, e.g. a SHA-1 hash algorithm, to the concatenated input data of 38 or 40 bytes formed from: Amount, Currency, Name and PAN. The first 4 bytes of the resultant 20-byte hash data structure are 'extracted' and treated as a 32-bit unsigned integer value. A modulus of 100,000,000 is then applied to this value to obtain a value in the range up to 99,999,999. If the currency code must be transmitted it is now appended. Finally a check bit such as a Luhn check-digit is applied across the digits computed so far and appended on the end to create the challenge. The full process flow is shown in FIG. 13.

The PCR Challenge will be passed as a number, with optional zero padding up to 8 digits. The zero padding is optional since the PCR does not rely on a fixed number of digits for the PCR Challenge, but rather uses an OK/Enter button to indicate the end of the PCR Challenge entry. To this number can be added the optional currency code and calculated check digit.

This transfer format should ideally be used for all types of device in order to keep logical differences between devices as small as possible, ideally only the communications protocol itself being different. This means that the difference between passing challenge data to either type of device lies purely in the communication/transfer mechanism and not in the processing of that data.

Since the challenge is passed in the AAV, a possible optimization for the Issuer Host is to use the last passed challenge in re-computing the PCR Token without needing to first re-compute the PCR Challenge. The drawback of this optimization is that the Issuer does not check the validity of the challenge, which might later lead to Cardholder dispute and potential chargebacks.

Figure 14:
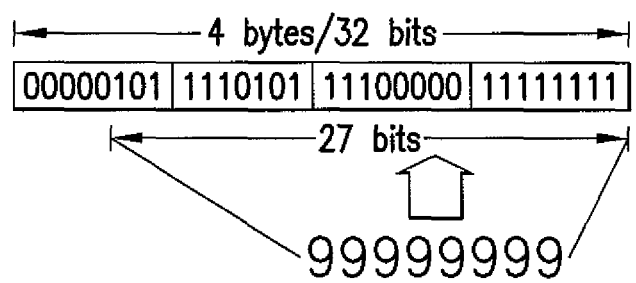
FIG. 14 shows 8 digits from a Challenge giving up to 27 bits of UN in accordance with an embodiment of the present invention.

The implementation of the scheme described uses an Application Cryptogram (AC) as the mechanism for authenticating the ICC and the cardholder. The command, GenerateAC, is used to request the ICC to generate either an Application Request Cryptogram (ARQC) or if bit 7 of the IAF is set to 1, an Application Authentication Cryptogram (AAC). The data that can be supplied in this command is:
- Unpredictable Number (UN)
- Amount
- Currency The Unpredictable Number (UN) is a 4-byte/32-bit component of the data passed to the ICC in the GenerateAC command. It is a number/data that is unpredictable to the ICC, as opposed to the application, and is effectively the transaction-related challenge to the card. The PCR Challenge is used to make up the UN. The maximum number of 8 digits of the challenge account for the lower 27 of the 32 bits required for the UN. The remaining 5 bits will therefore, be zero for the purposes of this scheme. The UN part of the PCR Challenge should be thought of as passing a numeric value (see FIG. 14). When this numeric value is treated as an unsigned 32-bit integer, all bits past the highest significant set bit are implicitly set to 0. When the UN is sent to the card, the raw "binary" value of the decimal numeric challenge entered by the cardholder is passed in the APDU command. It is not sent as the BCD encoded equivalent of the entered challenge digits.

The use of the amount and currency is at the discretion of the Issuer. When the Issuer has indicated that the amount and currency must be used, the Personal Card-reader will have been supplied with amount and currency data. The currency is supplied as part of an extended PCR Challenge and the amount is transferred/entered explicitly/separately. When the Issuer has indicated that the amount and currency must not be used, or has not indicated this choice and the default of not using them has been followed, then default values for the amount and currency can be used.

Figure 15:
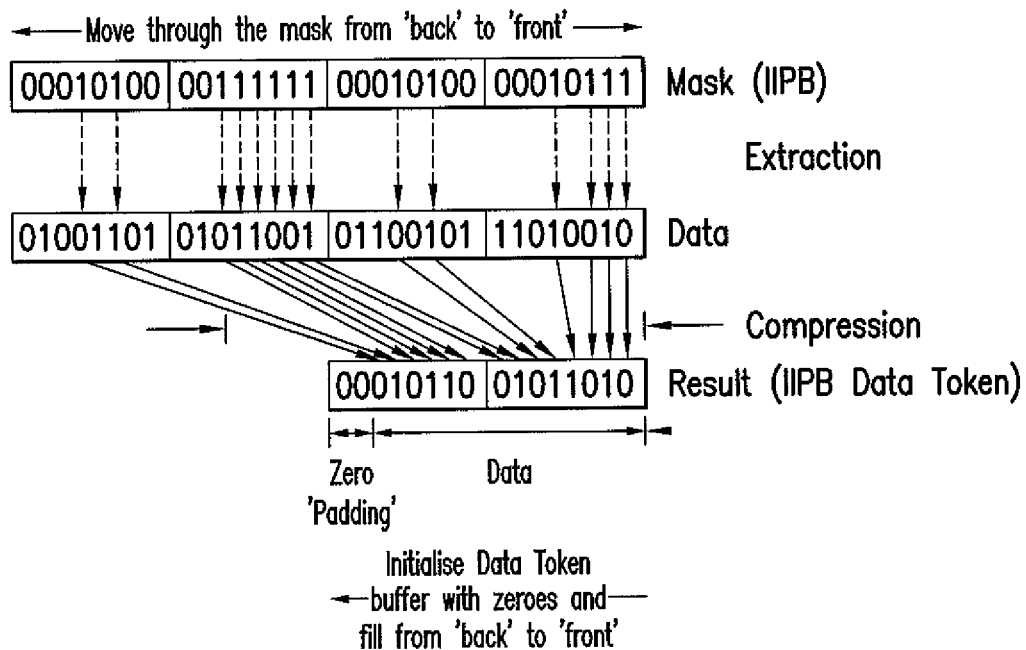
FIG. 15 shows Bit Extraction and Compression in accordance with an embodiment of the present invention.

As the full response to the GenerateAC command may be too large to be sent to the Issuer, the PCR can use the IIPB to perform a data extraction and compression process that results in a string of bit values that the Issuer has determined must be communicated to them—see FIG. 15. A bit setting of 1 can be used to indicate that the corresponding bit position in the data is required and needs to be sent. A bit setting of 0 can be used to indicate that the Issuer either knows, or is able to otherwise derive what the bit setting should be and thus the bit does not need to be sent. The IIPB data token is preferably built up from right to left, with the first bit to be extracted placed into bit 1 of the last byte of output data, the second in bit 2, etc. The IIPB data token is filled in this manner until there are no more bits left to transfer.

The IIPB Data Token is the data, which is transferred from the PCR to the Cardholder IA. All connected device types transfer this data directly to the MCD, whereas an unconnected device will use the cardholder to transfer this data manually.

Figure 16:
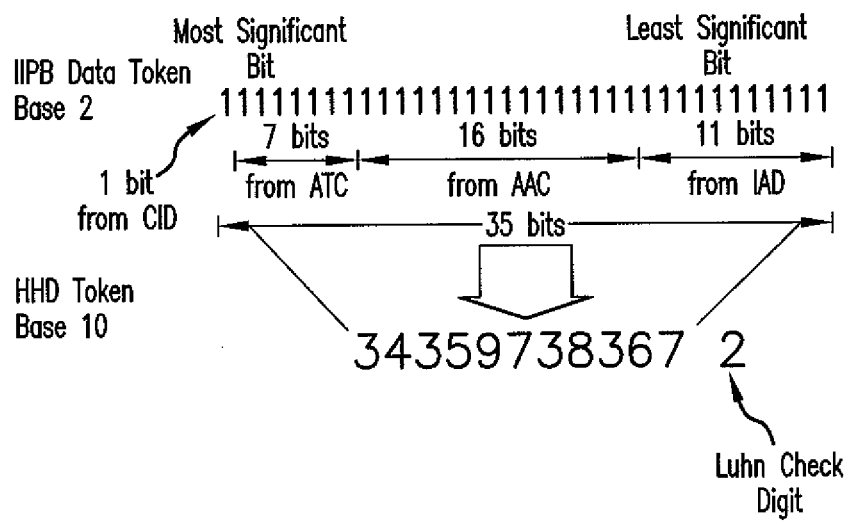
FIG. 16 shows an example of Conversion of Required Data Bits from Base 2 to a Base 10 Token.

With respect to the PCR Token for an Unconnected Device, an unconnected device will compute and display a number that represents the bit pattern of the data to be transferred. The cardholder must then enter this number into the appropriate area made available in the Cardholder IA running on the MCD. An unconnected PCR creates a numeric token, generated purely to transfer data from the PCR to the Cardholder IA running on the MCD, from the IIPB Data Token. It is important that the algorithm used for converting the bits into displayed numeric digits is interoperable and thus reversible on the Cardholder IA, i.e. the same algorithm used to convert from bits to token must be reversed to convert from token to bits. A "compressed" way to do this is to treat the bit pattern as a binary number and perform a mathematical conversion from Base-2 to Base-10 (FIG. 16).

The PCR Token may be presented using spaces, dashes or commas as separators, and is limited to a maximum possible display length, e.g. of 20 digits, including one or more check digits.

The Cardholder IA will not expect any particular sized token as it will use leading zero padding when encoding the IIPB Data Token into the UCAF to fill the remaining data space.

Error detection and correction can be provided. The PCR Token can make use of one or more check-digits such as a Luhn check digit, applied across the full token digits. The Cardholder IA will verify the check digit to report any transmission errors. In case of any mis-keying, the Cardholder IA will inform the cardholder who will have to re-enter the PCR Token in the Cardholder IA.

For a One-Way Connected Device the communication mechanism between the PCR and the Cardholder IA on the MCD can be proprietary, and any error detection mechanism can also be proprietary. However, it must be possible for the Cardholder IA to recognize that an error has occurred, particularly in one-way connected devices where it might not be possible to perform any type of hand-shaking protocol, and inform the Cardholder. Since in the uncommon event of a transmission error, the Cardholder IA will not be able to inform the PCR of that error, it is acceptable to ask the cardholder to repeat the authentication process on the PCR again from the beginning, i.e. Inserting card/switching on, entering data and PIN and then allowing the PCR to retransmit. Alternatively the PCR might employ a retransmit function/button.

For other connected device types, The communication mechanism between the PCR and the Cardholder IA on the MCD can be again proprietary, along with any error detection mechanism.

Figure 17:
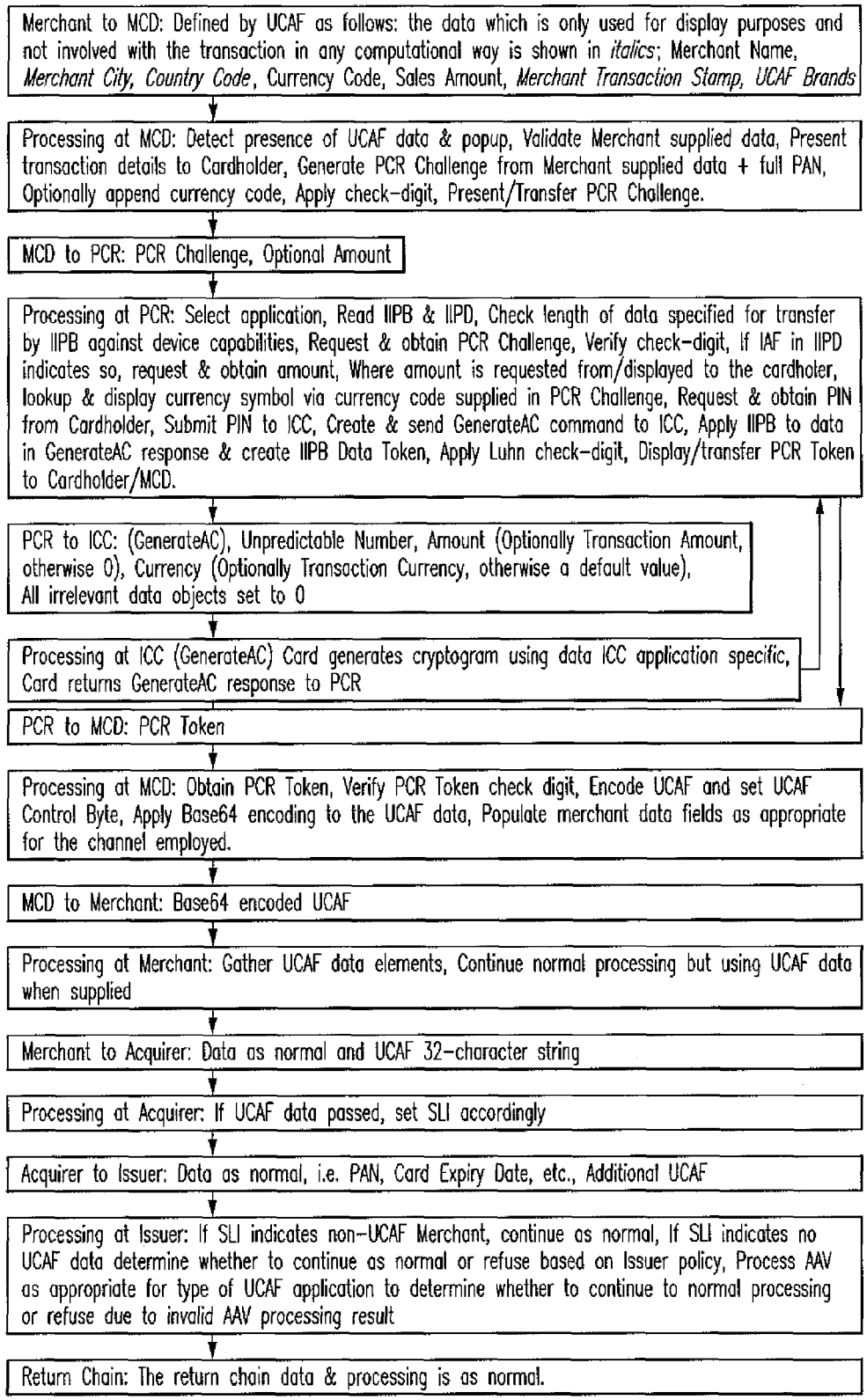
FIG. 17 shows an overview of the flow process according to an embodiment of the present invention.

A summary of the complete process described above is given in FIG. 17.

Using Chip-UCAF—a Cardholder's Perspective

Cardholders must subscribe into the scheme. In order to use Chip-UCAF, a cardholder will first need to have a suitable ICC. They will then need to have a Personal Card-Reader (PCR, either connected or unconnected) and the necessary thin-client Cardholder Interface Application (IA) software installed on a main accessing device such as a PC. Due to the nature of UCAF being a payment authentication scheme only for payment card details which have already been provided, the Cardholder Interface Application (IA) only responds to authentication requests for payment cards whose PAN it already knows about. Therefore Cardholders pre-register the details of any payment cards they intend to use for payment, with the Cardholder IA before those cards will be able to be used for UCAF authentication. When requesting authorization with a UCAF-enabled merchant, the Merchant will present the UCAF data to the Cardholder. When a UCAF client is available it will interact with the Cardholder. Cardholders will be required to "know" a first and a second code, namely the PAN and the IIPD. The Cardholder must be responsible for keeping details of their PIN secret, so that in the event that an attempt is made to use the card without the Cardholder's permission it may not be possible for a PCR to produce a token without the correct PIN. The cardholder may need to install the local Chip-UCAF client on each PC that will be potentially used for e-commerce based purchases. The cardholder must register the PAN details of each payment card that will be used for UCAF payment authentication with the Cardholder Interface Application, before trying to use that card for payment and associated authentication.

From the Merchant Perspective

Figure 18:
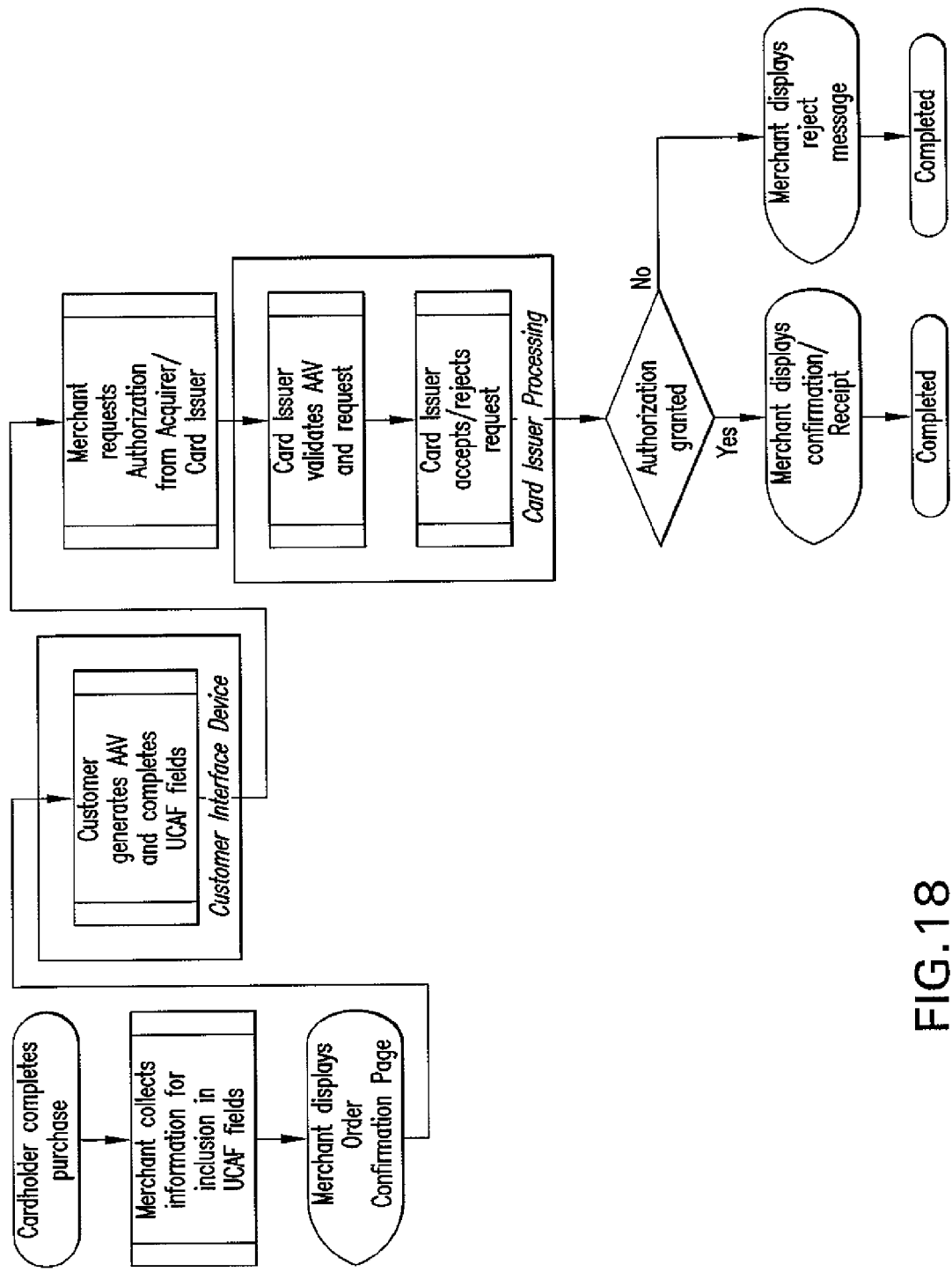
FIG. 18 shows a flow process from the completion of the purchase to merchant acceptance according to an embodiment of the present invention.

The main merchant process flow is shown in FIG. 18. The two main aspects of concern to the Merchant are firstly changes to merchant web pages and secondly the processing required to support UCAF. In order for Merchant servers to support Chip-UCAF the Merchant server will have to present additional data via its web-site and process additional data inserted via the Cardholder Interface Application. For the purposes of describing the UCAF scheme in the context of the effort required by Merchants, two types of relationship that a customer can hold with the Merchant as a Cardholder will be considered: Profiled, Non-Profiled. Express checkout and single-click require cardholders to be profiled whilst standard checkouts can be used by profiled and non-profiled cardholders alike. Single-click generally requires the customer to have allowed the single-click option, as many customers feel uncomfortable with this impulse purchase ability. In order to use UCAF, the Merchant server must have knowledge of certain Cardholder's payment details, e.g. PAN, Expiry Date and CVC2, before presenting a UCAF Authentication Page containing the UCAF hidden data fields, since one of the fields must contain the last 5 digits of the PAN being used for the transaction.

Figure 19:
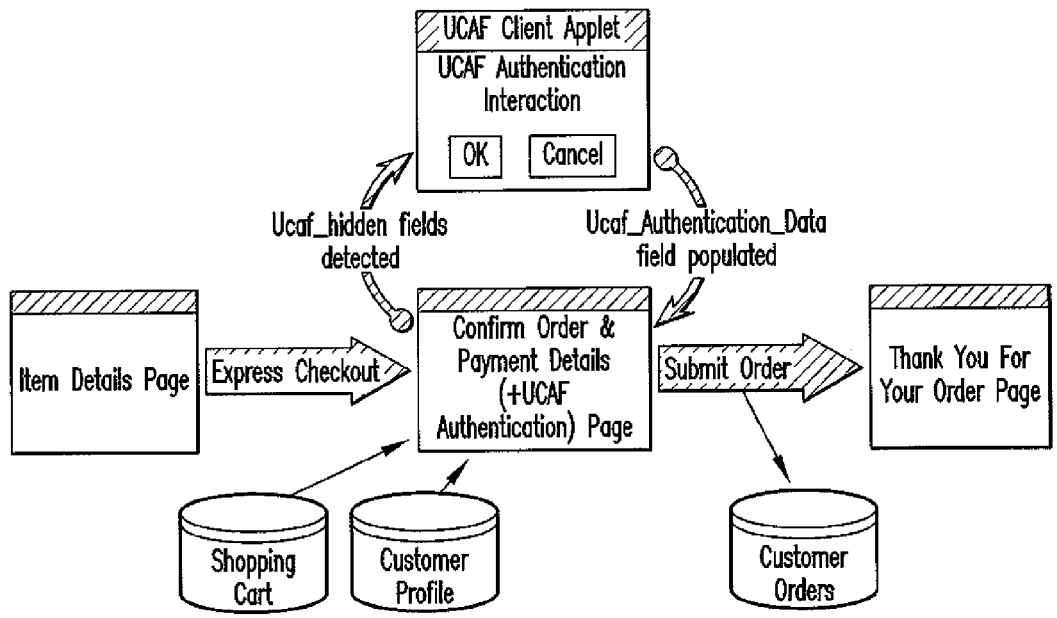
FIG. 19 shows a modified Express Checkout Page Flow according to an embodiment of the present invention.

To support the use of UCAF for the express checkout (FIG. 19), the order/payment details confirmation page must support the UCAF hidden fields and becomes, in UCAF functionality terms, a UCAF Authentication Page. This provides the opportunity for the Cardholder Interface Application (Cardholder IA) to present itself and request the necessary interaction with the Cardholder to obtain the UCAF authentication data. The Cardholder IA can then populate the UCAF authentication field prior to submission of the order by the cardholder.

Figure 20:
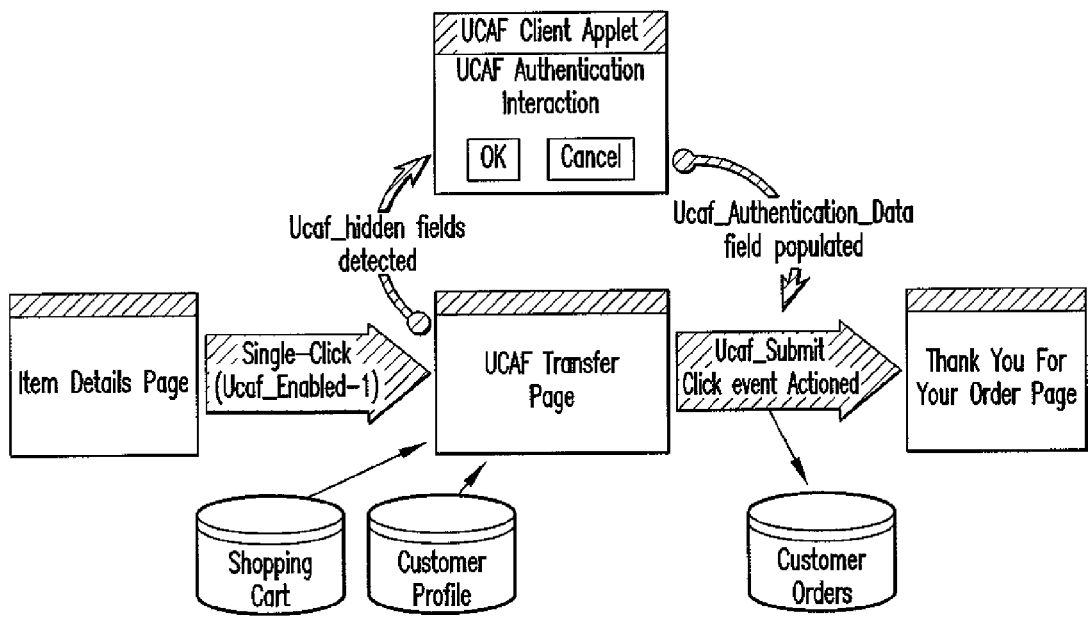
FIG. 20 shows a modified Single-Click process flow according to an embodiment of the present invention.

To support the use of UCAF during the single-click purchase process (FIG. 20), the merchant server can support a UCAF Transfer Page. The UCAF Transfer Page is not intended for use by the cardholder and its display should indicate that an authentication process is underway. This page acts as the UCAF Authentication Page and presents the hidden UCAF fields. The UCAF Transfer Page must also support the UCAF hidden fields and provides the opportunity for the Cardholder Interface Application to present itself and request the necessary interaction with the Cardholder to obtain the UCAF authentication data. Some merchants that offer single-click also offer the facility to automatically combine a series of single-click purchases, conducted within a certain timeframe, into one single order. I.e. "I'll have that—Click—that—Click—oh yes and that—Click." Where multiple adjacent single-click purchases are combined, authorization will generally only be sought after the order is "closed" and the combined cost is known. This leaves an issue of how to resolve the amounts used for authentication against the amount used for authorization as well as the disruption to the single-click process. Merchants may decide to authenticate;

Only the initial purchase of a combined single-click shopping action—by special arrangement, the Acquirer would then need to treat the authorization as it would for a currency converted authorization. This means putting the initial amount—the amount used for the authentication process so that verification of the authentication could take place.

Each purchase cumulatively—Each Single-Click is accompanied by an authentication request (UCAF Transfer Page) to the Cardholder and each time the amount increases in line with the current accumulated total. Only the last UCAF authentication would then be sent to the Issuer.

The UCAF Transfer Page is required when a cardholder using UCAF initiates a single-click checkout in order to be able to invoke the authentication process and supply the UCAF data. Thus, the merchant must know if UCAF is being used prior to the single-click option being selected by the cardholder. An additional hidden field, the UCAF Enabled field, must be supported on each and every page that provides the single-click checkout option.

The Cardholder Interface Application will recognize this field and automatically fill the field with a certain value such as "01" to indicate that a UCAF compliant Cardholder IA will facilitate the payment.

The UCAF Transfer Page does not need to be displayed when a single-click checkout is initiated without a UCAF compliant Cardholder IA that can perform the UCAF authentication for the particular card used by the Cardholder.

To minimize the impact on the single-click concept and complete the form fill process on the UCAF Transfer Page allowing the Merchant to collect the data, the Cardholder IA initiates a click event on a hidden button. The merchant provides the hidden button, the "UCAF Submit" button, on the UCAF Transfer Page. This button allows the Cardholder IA to initiate a click event when the form filling is complete. When the click event occurs the "page" transmits the data that is to be sent in the authorization request, to the Merchant's web server.

Since the IA cannot tell whether a page is a Transfer page or not, whenever a UCAF Submit button accompanies the required UCAF data input fields and authentication field on a page, the IA will always action it on completion of the authentication token generation process. Merchants are free to use this ability as they wish, i.e. they may utilize "auto submit" on conventional UCAF Authentication pages if they wish to do so.

If the IA detects errors that result in setting specific error indication contents into the UCAF Authentication data field, or if the Cardholder cancels, and there is a UCAF Submit button present, the IA will still action the click event, submitting the form data to the merchant. Merchants that wish only to send "good" authentication data should therefore be aware of the error indications and consider returning an appropriate error page to the Cardholder.

Figure 21:
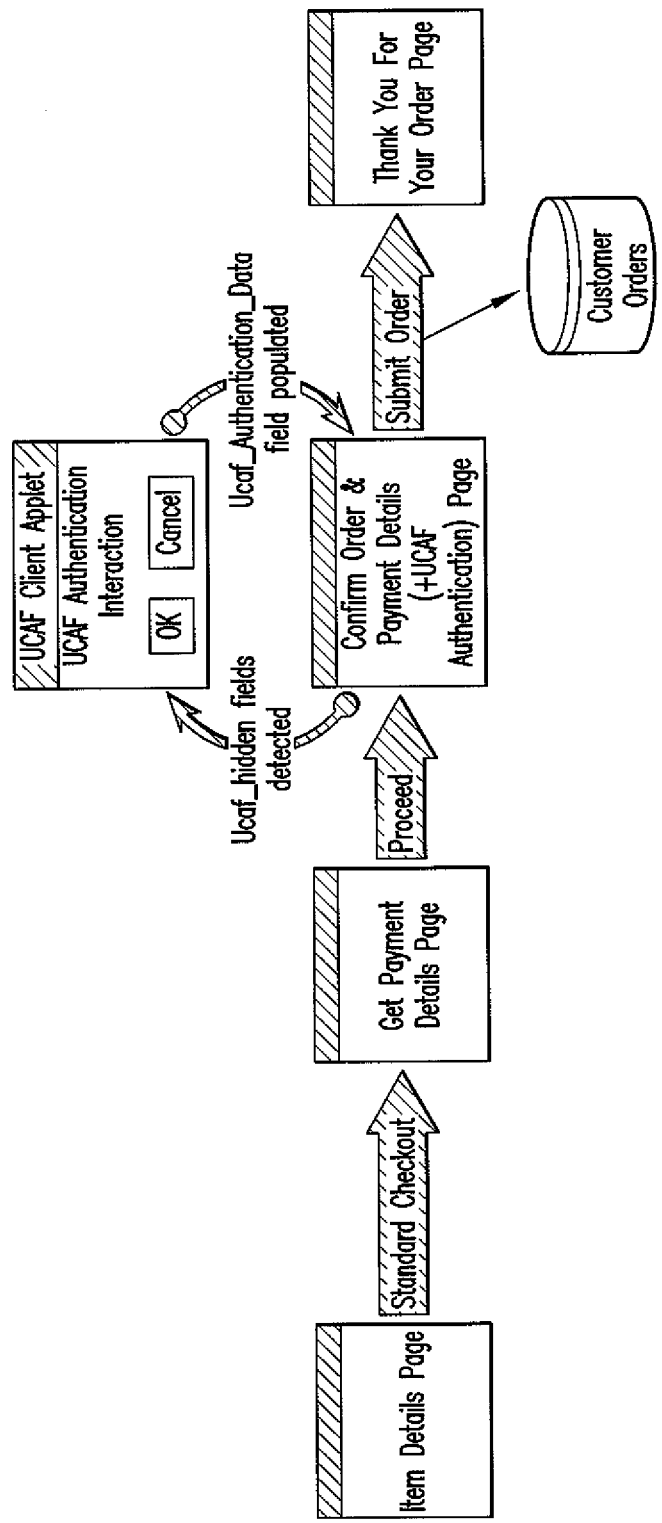
FIG. 21 shows a modified standard process flow according to an embodiment of the present invention.

To support the use of UCAF for a standard checkout (FIG. 21), the order/payment details confirmation page must support the UCAF hidden fields and become a UCAF Authentication Page. This provides the opportunity for the Cardholder Interface Application (Cardholder IA) to present itself and request the necessary interaction with the Cardholder to obtain the UCAF authentication data. The Cardholder IA can then populate the UCAF authentication field prior to submission of the order by the cardholder.

In order to use UCAF, the Merchant must have knowledge of the Cardholder's payment details, PAN, Expiry Date and CVC2, before presenting a UCAF Authentication Page with UCAF hidden data fields, since one of the fields must contain the last 5 digits of the PAN being used for the transaction. Therefore when using UCAF the combined order details confirmation/payment details requesting page must be split into two pages, as illustrated.

The UCAF Authentication or Transfer Pages are web pages that the merchant presents to the cardholder in order to confirm order and payment detail information. For UCAF-enabled merchants these pages are the facility by which UCAF data is presented and captured, prior to attempting an authorization. Hence, the UCAF Authentication Page and the UCAF Transfer Page are the primary integration points among Merchant, Cardholder and Issuer.

The UCAF Authentication Page contains cardholder and transaction specific data that is transmitted via the public Internet. Therefore, the UCAF Authentication Page should preferably be protected using a sufficiently secure encryption method (e.g. 128-bit SSL or equivalent) to prevent the compromise of this data.

All merchant server interaction with the Cardholder IA in the PC Browser based channel is via hidden HTML form fields. In order to ensure interoperability with all merchants and all UCAF applications, the implementation of these hidden fields has been standardized, including naming conventions, size and allowed content.

Incoming data fields, i.e. supplied by the Merchant, appear in the HTML page source delivered by the Merchant web server to the Cardholder's browser. The values for these fields are set directly within the page source and are expressed in character string format. e.g.
<INPUT type="HIDDEN" name="Ucaf_Currency_Code" value="978">

Outgoing data fields, i.e. returned by the Cardholder, appear in the HTML page source delivered by the Merchant web server to the Cardholder's browser. The values for these fields are initially set to blank values within the page source.
e.g. <INPUT type="HIDDEN" name="Ucaf_Authentication_Data" value=" ">

The Cardholder IA will, by interacting with the browser's Document Object Model (DOM), set the values programmatically as character strings.

For incoming Merchant Supplied Data, the Merchant server presents the data values it must supply in the following hidden form fields:

Ucaf_Merchant_Name—The Merchant's name consists of 88 hexadecimal characters (0-9, A-F) as 22 groups of 4 characters, with each group representing a Unicode character. The name supplied by the merchant in the UCAF field is the name that will be displayed to the cardholder by the Cardholder Interface Application (Cardholder IA). It is also the name that will be used in the generation of the challenge.

Ucaf_City—Up to 13 characters, the city to which the Merchant is registered with their Acquiring bank.

Ucaf_State_Country—Up to 3 characters to carry the US State code or 3 character ISO 3166 alphabetic country code.

Ucaf_Currency_Code—The three digit ISO 4217 currency code for the currency of the transaction.

Ucaf_Sale_Amount—Up to 12 digits for the amount of the transaction expressed in the base currency units reflected by the currency code.

Ucaf_MTS—An optional field containing the hexadecimal representation of a two-byte merchant reference.

Ucaf Brand—A two digit code representing the brand of the payment card details selected for this transaction by the Cardholder.

Ucaf Payment_Card_Number—The last 5 digits of the payment card details selected for this transaction by the Cardholder. This is used by the Cardholder IA(s) to determine if the card being used is one with which they are familiar and can therefore act on behalf of in order to produce a UCAF account holder authentication value.

With respect to outgoing Cardholder Returned Data the Merchant presents the following hidden fields in order to collect authentication information: Ucaf_Authentication_Data—Set to blank, i.e. '=" " by the Merchant and populated by the Cardholder IA with the UCAF Authentication Data. The data is returned to the Merchant in the usual way for HTML form data. That means that all of the form fields will be "POST"ed back to the Merchant's web server in a HTTP POST request, in text format. Both incoming and outgoing fields are posted back with the Merchant's web server process distinguishing between which data it is interested in as returned data and which it will not pay attention to as it was originally sent data. i.e. the read-only aspect of incoming fields is effectively enforced by the Merchant's processing just not making use of the data it is sent by the browser.

With respect to the additional UCAF Fields to Support Single-Click, in order for the merchant to be able to support UCAF and present the UCAF Transfer Page during a Single-Click payment, the following hidden form elements must be present on any and every page that it is possible to select a Single-Click payment option from;

Ucaf_Payment_Card_Number—The last 5 digits of the payment card details selected for this transaction by the Cardholder. This is used by the Cardholder IA(s) to determine if the card being used is one with which they are familiar and can therefore act on behalf of in order to produce a UCAF account holder authentication value.

Ucaf_Enabled—Set to 0, i.e. '="00"', or blank, i.e. '=" "', by the Merchant and set to "01," by the Cardholder IA if there is one and the payment card number matches a payment card known to the Cardholder A.

Cardholders may opt to use a Single-Click method of payment because of its ease and lack of required interaction. In order to maintain this smooth flow for cardholders when using the extra authentication requirements of UCAF, a form submission button is made available. The Cardholder IA initiates a click event to automatically submit the UCAF Transfer page to the Merchant on completion of obtaining and populating the UCAF authentication data.

To properly implement this click event, the UCAF Transfer Page needs the following additional hidden form element;

Ucaf_AAV_Submit—The hidden virtual button for the Cardholder IA to initiate a click event on.

The merchant server can capture relevant data and store it. The merchant server can capture and retain the UCAF Authentication Data Field supplied by the Cardholder Interface Application. The Authentication Data Field provides the merchant with data that links the cardholder to transactions. This data is required for the submission of subsequent authorizations for split-shipments and may be of value to the merchant during exception processing.

Merchants are required to request authorization for all Chip-UCAF e-commerce transactions. Merchants must supply the UCAF on all authorization attempts. Subsequent authorization attempts must also include the AAV. However, the merchant needs to adjust the Control Byte for subsequent authorizations. The issuer may decline initial authorization requests with an AAV older than a certain time such as 30 calendar days.

UCAF Authentication data need not be sent in "real-time" to Issuers, just as authorizations need not be sent in real-time. Authorization requests including UCAF authentication data therefore do not need to be treated any differently to normal authorization requests in respect of batching data sent to the Merchant's Acquirer. Pre-authorizations are also allowed and are treated as for the initial authorizations.

Recurring payment transactions should include AAV data for the initial authorization only. The initial authorization for a recurring payment may be eligible for Chip-UCAF processing. Merchants need not provide UCAF data in recurring payment authorizations for recurring transactions.

Merchants are required to obtain authorization for each part of a split shipment. Merchants must supply the UCAF with each authorization request both initial and subsequent. Failure to modify the Control Byte on subsequent authorizations may result in Issuer declining at the time of authorization.

Merchants may need to repeat an Authorization Request, for example they do not receive a response to the original authorization request within some time-out period, or they receive other indications of an error in transmission of data to the Acquirer. In such circumstances, the UCAF authentication data should be treated as for an initial authorization. Existing protocols indicate to Acquirers whether an authorization request is a repeat submission or a re-submission.

Under some circumstances, a merchant may generate a second authorization request for a given Chip-UCAF transaction that has the same AAV value as the original transaction.

In the following addresses authorization requests that are not bit-wise identical to the original request are addressed—for example, the authorization requests might have different system-trace ID numbers. A merchant might generate second authorization requests when:

They wish to re-transmit an authorization request after an initial decline.

It fully reverses the original authorization, but later decides to re-instate it.

Merchants should treat such authorizations as subsequent authorizations by modifying the value of the Control Byte. This will prevent them from being erroneously rejected at the AAV verification facility as possible replay attacks.

Merchants should not be concerned with the content of the UCAF data, as this is intended for the Issuer, except under two circumstances;

Modification of the Control Byte when making subsequent authorizations

Checking for Interface Application detected errors, notified to the Merchant via certain UCAF contents.

When processing subsequent authorizations due to a split shipment, for example, merchants must modify the Control Byte in the UCAF contained in the initial authorization from the value set by the Cardholder Interface Application by clearing the top bit. This reflects that the UCAF authentication is supplied as part of an authorization subsequent to the initial authorization.

The Control Byte can be modified by Base64 decoding the UCAF data to get the 24-byte value, changing the value of the first byte and then re-Base64 encoding to create the updated UCAF. Or, simply by changing the first Base64 encoded character by subtracting a constant of 38 from the ASCII character value of the first character to produce a new value for the first character.

If the Cardholder IA detects errors in the data supplied by the Merchant either through data format/validation problems, or missing required Ucaf hidden fields, or has its own internal problems, the Cardholder IA will attempt to inform the Merchant. Since UCAF is an authentication mechanism and not a payment scheme, Merchants are free to make their own judgment on whether to continue the authorization process with unsupplied or error indicated UCAF data.

If the Cardholder cancelled the authentication process, the Ucaf_hidden field called Ucaf_Authentication_Data will be set to an empty value and thus appears no different to not having a UCAF client.

The merchant server has the ability to detect the presence of UCAF data in a record submitted on their UCAF Authentication Page or UCAF Transfer Page. If UCAF authentication data is present the merchant must submit it unaltered to the acquirer for transmission of initial authorizations. The merchant only modifies the value of the Control Byte for subsequent authorizations. The merchant also flags the transaction as UCAF-enabled so that the acquirer is able to populate the security level indicator with the appropriate value.

If no UCAF authentication data has been supplied, the merchant must indicate this to his/her Acquirer so that they are able to populate the security level indicator with the appropriate value.

On the link between Merchant and Acquirer some of the data content can be protected against modification en-route through the use of applying a MAC, and in such a case the UCAF data can also be included as input to the MAC.

Cardholder Interface Application Functional Requirements

The Personal Card-reader Interface Application (Cardholder IA) is the component of software that acts as the interface between the Merchant, the Cardholder and through the Cardholder the Personal Card-Reader (PCR). The standard Cardholder IA plays no part in the payment instrument decision process, although vendors are free to add support for greater functionality that might indeed include support for the Cardholder in selecting the appropriate payment card. The Cardholder IA must, once invoked, perform the following actions;

Retrieve data from Channel.

Determine if the PAN being used for the transaction is a PAN known to it.

Validate the Merchant Transaction Data.

Display the transaction details to the Cardholder.

Ensure that the selected PAN and any name by which that card is known to the IA is clearly displayed to remind the Cardholder of the physical ICC they need to use to perform the Authentication.

Compute and display the PCR Challenge.

Ensure that instructions are displayed or available so that the Cardholder is aware of the actions they need to take, which may include entering their PIN on the Personal Card-reader.

Wait for the Token to be entered by the Cardholder as an indication of the Cardholder's approval.

Populate the AAV in the UCAF, and Base64 encode the resultant UCAF data.

Populate the Channel with the required UCAF data field.

Instruct the Cardholder to submit the data to the Merchant, or if processing a single-click purchase, in the PC Browser Channel, 'fire' the submit button's click-event.

Finally perform any optional logging.

The Cardholder IA should be automatically activated when the appropriate point in the Merchant ordering process has been reached. The Cardholder IA is able to receive the data from the Merchant, through the delivery channel supported by that Cardholder IA and specified in the appropriate channel specification. The Cardholder IA validates the Merchant input data, and only proceeds with transaction data that is valid. The Cardholder IA also obtains certain input data from the cardholder relating to the payment card that will be used for the transaction. The Cardholder IA displays information to the Cardholder about the transaction, which must include the amount of the transaction in a representation that includes the currency letters, e.g. EUR, USD, etc. with the correct amount formatting. The PCR Challenge is displayed to the Cardholder with a clear instruction that this must be entered into the PCR. It may also clearly indicate that the Cardholder will be required to enter their PIN into the PCR and that the resultant PCR Token should be entered into the Cardholder IA.

The Cardholder IA generates, or causes to be generated, the PCR Challenge and, on receiving the PCR Token, the IA populates the AAV and Base64 encodes the UCAF.

The Cardholder IA is able to send UCAF data to the Merchant server, through the delivery channel supported by that Cardholder IA and specified in the appropriate channel specification.

The Cardholder IA may also provide additional "ease of use" facilities such as field auto-fill functionality for payment details, PAN, Expiry Date and additional customer details such as address. It is quite possible that the Cardholder will register more than one payment card with the Cardholder IA, and so the Cardholder IA would then have to offer the Cardholder a choice in any form filling for which card was being used for a particular payment. The details for these requirements are out of the scope of this document. The IA may support ECML (E-Commerce Modelling Language) form filling and "best guess" field name auto filling.

The Merchant has to supply the last 5 digits of the payment card number in the Ucaf_Payment_Card_Number field on any page on which it is looking for some interaction with a UCAF Cardholder IA which might be installed on the Cardholder's PC. Cardholder IAs must only activate to authenticate a card that it already has prior knowledge of, i.e. the last 5 digits supplied by the Merchant match the last 5 digits of one of the cards registered with that Cardholder IA.

When enabled to run, the Cardholder IA integrates into or otherwise attaches itself to the Internet browser process in such a way, as it is able to determine the field names of fields within forms on any given web page, as pages are loaded and display in the browser.

When any of the defined UCAF form fields are recognized, the application must then start the UCAF processing and extract the necessary data from those fields in order to continue with the authentication process.

Figure 22A:
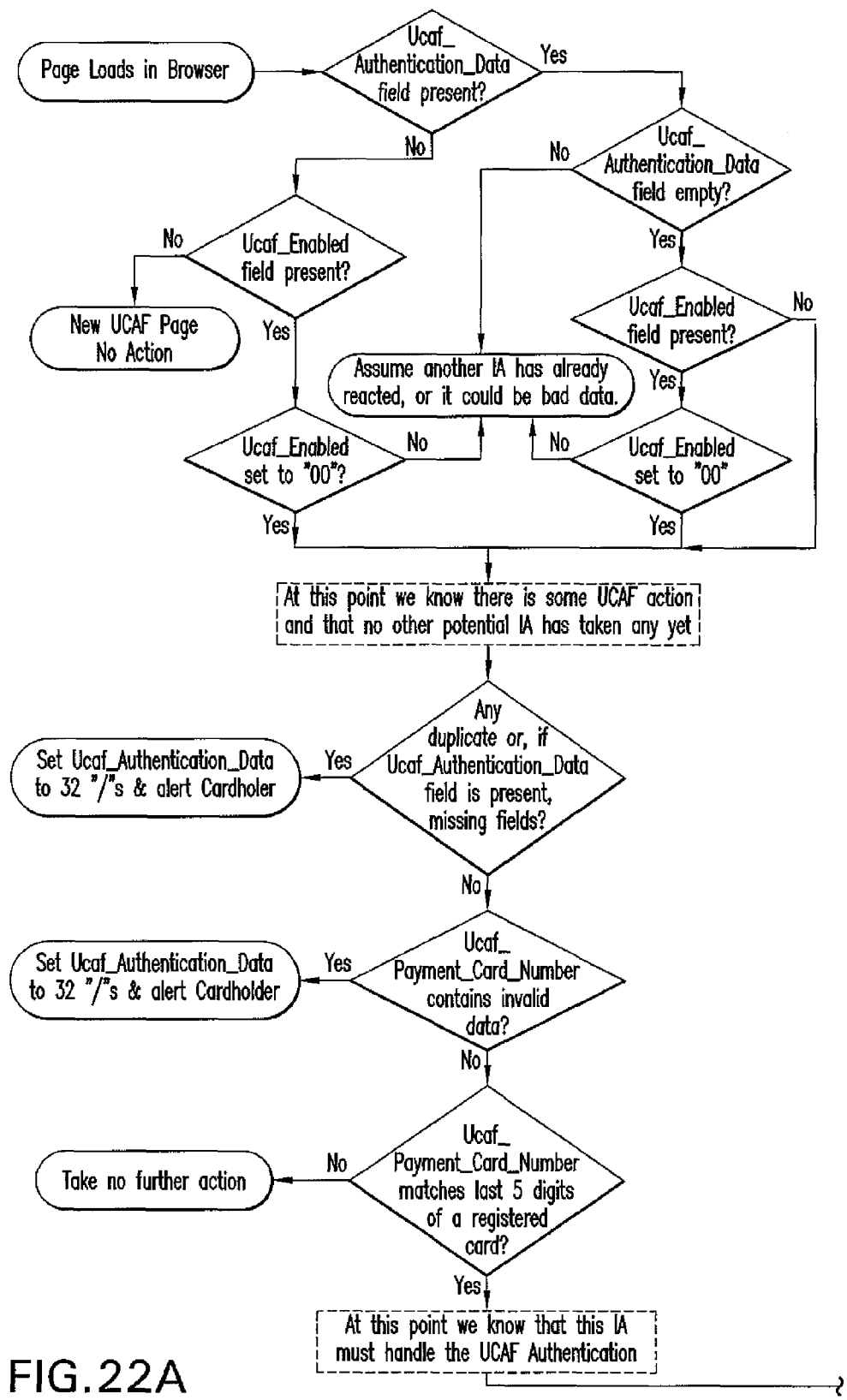
FIG. 22 shows a card activation process flow according to an embodiment of the present invention.
Figure 22B:
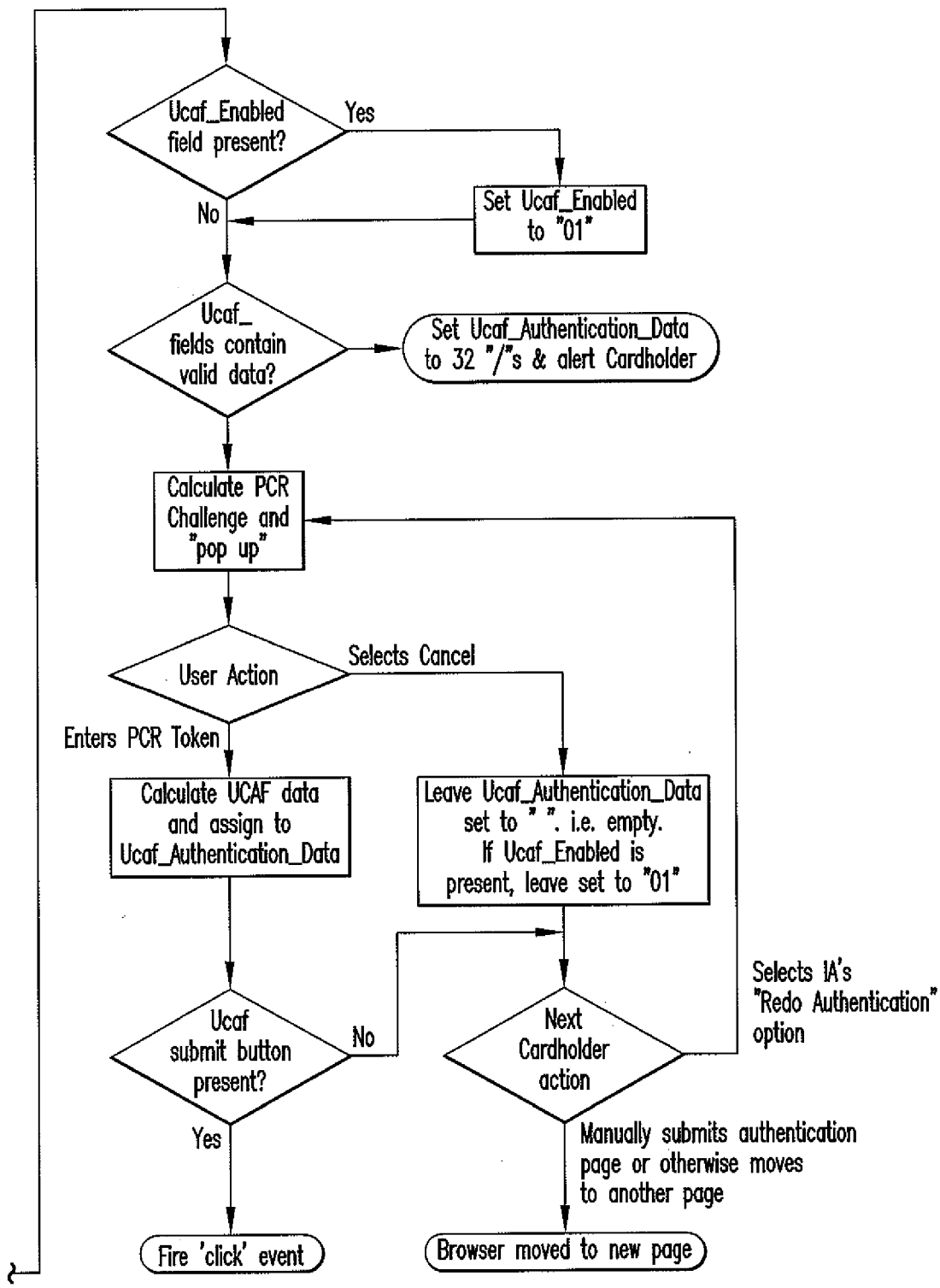

The Cardholder IA activation flow is shown in FIG. 22.

Figure 23:
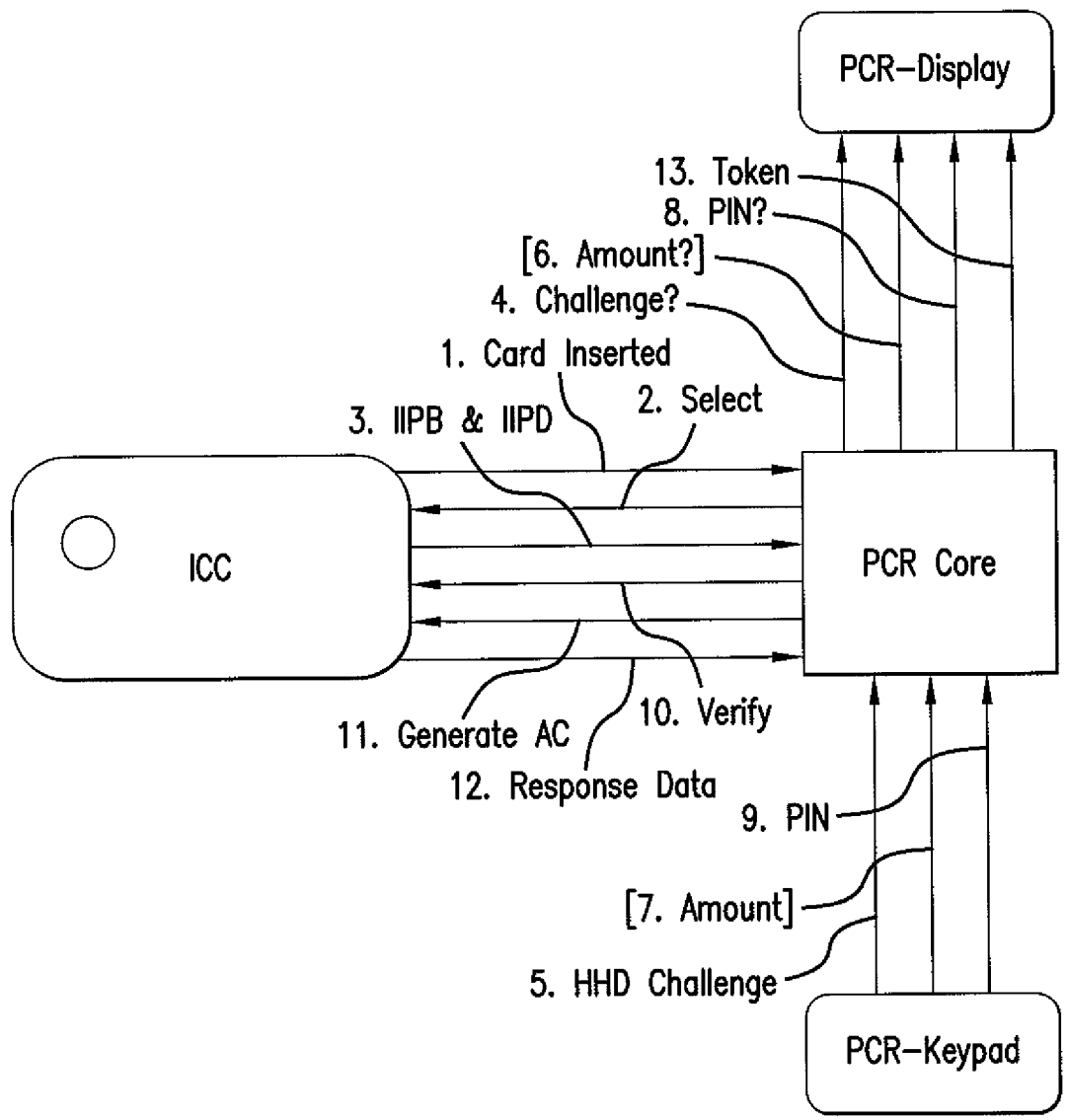
FIG. 23 shows a PCR-ICC interchange process flow according to an embodiment of the present invention.

The Personal Card-Reader (PCR) is a component in the Chip-UCAF scheme. FIG. 23 is a conceptual diagram of PCR processing flow.

1. Processing begins when the cardholder inserts an ICC 5 into a connected or an unconnected device. In the following an unconnected device will be assumed.

2. The PCR looks for the ICC 5 and relevant programs on the card and confirms the card to the Cardholder by displaying the application label for a brief time;

3. The Personal Card-reader may read the Issuer Internet Proprietary Bitmap (IIPB) from the ICC 5. Alternatively, the Personal Card-reader may utilize an IIPB stored on the PCR. The length of the IIPB may be the same as the length of the data token for a particular PCR. In such a case, the IIPB is applied to select the bits in the token data. Alternatively, the IIPB length may be greater or lesser than the length of the data token. The PCR may display the message: Fatal Error. The PCR may also establish rules to deal with this situation. For example, if the IIPB length is less than the data token length, the IIPB may be padded on the right hand side by appending as many bytes 00 as required to make its length the same as the token data length, and the result is applied to select the bits in the token data. Similarly, if the IIPB length is greater than the data token length, the token data is padded on the right hand side by appending as many bytes of an AC filler buffer as required to make its length the same as the IIPB length. The IIPB is then applied to the result to select the bits required in the token data. The AC filler buffer may be computed using any AC bytes specified by the PCR.

4. The Personal Card-reader prompts the cardholder to enter the challenge. The Challenge includes data which will be used for the Unpredictable Number (UN), the transaction currency code (optional) and a trailing check digit.

5. The cardholder enters the 12-digit number displayed in a prompt on their main access device and the PCR checks for errors. The Personal Card-reader determines that the check-digit is correct and informs the cardholder if the challenge is valid or invalid. If invalid, the PCR again requests the challenge.

6. The Personal Card-reader prompts the cardholder to enter the amount of the transaction. If the authentication transaction did not make use of the transaction amount, this step would be completely skipped. Since the Challenge included the transaction currency code, the display incorporates the 3-letter currency symbol at the end of the display line, as a visual confirmation to the Cardholder of the currency.

7. The cardholder enters the amount displayed, in a prompt on their main access device.

8. The Cardholder may now enter their PIN and so the Personal Card-reader displays a prompt for the cardholder to enter their PIN.

9. The Cardholder enters their PIN digits and hits "enter".

10. The Personal Card-reader may submit the PIN to the ICC. If the ICC reports back an invalid PIN entry, the Personal Card-reader informs the Cardholder of the number of attempts remaining other wise it reports a valid PIN.

11. The device prepares a GenerateAC command using the transaction data as the Unpredictable Number and the amount and the currency code, all as entered by the cardholder. The command is sent to the ICC. If the authentication transaction did not make use of the transaction amount, default but valid values for the amount (0) and currency code (999) are used.

12. The ICC replies and the PCR uses the IIPB, which may be read from the card or stored on the PCR, to determine the bits from the response to the GenerateAC which must be stripped and compressed into a token. If no IIPB is found on the ICC, the default IIPB value stored in the reader is used. The default IIPB may be chosen through an IIPB selection mechanism which will be described herein. If the length of the IIPB is wrong, the Personal Card-reader may display the message: Fatal Error. Alternatively, it may pad either the IIPB or the token data as previously described herein.

13. The device then computes and displays an n-digit (+1 check-digit) numeric token. The cardholder reads and enters the token into the application on their main device. The application on the main access device verifies the check digit and informs the cardholder if the token contains an error and requests the token to be re-entered. If the cardholder correctly keys in the token the online-transaction process continues.

The above scheme requires certain data structures. The Issuer Internet Proprietary Data (IIPD) is an optional 0-byte to 32-byte general purpose structure containing binary data with the following structure;

Byte 1—IAF.

Bytes 2 to 31—Additional Issuer specific content.

The first byte of the IIPD is an Internet Authentication Flags (IAF) byte. Each bit communicates actions or options from the Issuer that the PCR must take/use. The flag settings indicate whether the amount and currency must be explicitly used in the AC generation and whether an AAC or an ARQC should be requested from the ICC. If the ICC 5 has no IIPD, then a default byte value of 0.times.40 is used for the IAF.

Any data following after the IAF is for the proprietary use by the Issuer. The Internet Issuer Proprietary Data (IIPD) allows an Issuer to specify proprietary data, generally card specific static data, to be transferred to the Issuer's authentication verification system to assist in the verification of the authentication token. It serves as a general-purpose object to hold Issuer proprietary data for the Internet authentication environment. The data to be conveyed within the IIPD is basically any card static data that is required by the Issuer Host system that will be verifying the Application Cryptogram, but is for one reason or another not able to be or is complicated to obtain from the card database. Examples might include the key derivation index and/or the cryptogram version number.

Cards may use a 1 digit Card Sequence Number (CSN). As the UCAF specifications make no provision for this field, the IIPD can be used to transfer the CSN. It will be carried to the Issuer by placing it in the IIPD, needing 4 bits to represent it. The positioning and format of the CSN is Issuer dependent.

The Cardholder must supply the IIPD, if there is one, directly to the Cardholder IA. This means an Issuer must communicate any card's specific IIPD to the Cardholder so that they may supply this data to the Cardholder IA as required. For reasons of interoperability, rather than supply the data in the more concise hexadecimal form, the Issuer will have to supply the IIPD, a variable whole number of bytes, in a decimal triplet form, i.e. each byte's value will be entered as a decimal value, separated from the next byte value by a dash or a space. Leading zero padding will be used to ensure the IIPD is presented as triplets. This requirement is necessary so that MCDs that have no dash or space key will be able to recognize each triplet.

Although the PCR only uses the first byte of the IIPD as the Internet Authentication Flags (IAF) byte, the full IIPD should still be personalized into the ICC. This is so that connected readers that are able to extract data from the ICC will be able to retrieve the IIPD, and thus not require the Cardholder to enter the IIPD manually.

A further data structure is the Issuer Internet Proprietary Bitmap. The Issuer Internet Proprietary Bitmap (IIPB) is an optional 11-byte to 43-byte structure containing binary data. The bitmap is a mask on the concatenated values of the data items CID, ATC, AC and LAD. It is not necessarily a straight mask on the response data, since both a first untagged and a second tagged GenerateAC response can be handled by the PCR. The second response data includes the tag and lengths as well as the values of, CID, ATC, AC and IAD. If the ICC 5 has no IIPB, then a default byte value may be used. After using the IIPB to determine the bits to be transferred in the IIPB Data Token, an unconnected PCR must build the PCR Token for display to the Cardholder.

Because of the limited data transfer available via not only the AAV data space within the UCAF, but more importantly from the unconnected Personal Card-Reader (PCR), it is the IIPB that defines which bits of information are passed to the Issuer in order to verify the authentication cryptogram. The IIPB is therefore the definition of the Issuer's verification data requirements. The IIPB is a mask of those bits that are required from;

Cryptogram Information Data (CID)
Application Transaction Counter (ATC)
Application Cryptogram (AC)
Issuer Application Data (IAD)

The only information required from the CID is whether the AC generated by the card was an ARQC or an AAC. Since the card will generate either an ARQC or an AAC, there is no need to send both cryptogram indicator bits, only the topmost of the two indicator bits being required. The remainder of the CID is set as indicated below and so not sent.

The ATC is a 16-bit counter which increments after each transaction. The value of the ATC is included in the cryptogram and provides a uniqueness to the cryptogram. Due to the incrementing nature of the ATC it is possible to reduce the number of bits of the ATC which are transmitted quite substantially.

The cryptogram (AC) that is requested to be computed by the ICC for this scheme is an Application Request Cryptogram (ARQC), however some card implementations may opt, or be required by their Issuer, to generate an Application Authentication Cryptogram (AAC) instead. In both cases the AC is an 8-byte Message Authentication Code (MAC), computed over data passed to or otherwise known to the ICC. Only 2 bytes of the 8-byte AC are transferred in the PCR Token and the Issuer Host processing must take this into account when comparing the received AC with the AC generated by reconstitution. Which 2 bytes are selected is of course determined by the IIPB.

The Issuer Application Data (IAD) contains fields with a combination of assumed static values, transaction specific values and issuer known values including the Key Derivation Index and the Cryptogram Version Number which are static values stored in the card and which the Issuer is able to retrieve from the ICC database based on the PAN and Expiry Date and so do not need to be transferred. Also included is the Dynamic Authentication Cryptogram (DAC) which is a constant and this does not need to be transferred. Also included are Card Verification Results (CVR) which is a 4-byte field of which Byte-1 is the length of the CVR and is a fixed known constant. Bytes 2, 3 and 4 contain a mixture of assumed and required transaction or card specific bit values. These bits may provide valuable information as to whether offline PIN verification was successful, whether the PIN retry number was exceeded, whether there were previous transaction failures, or any other information the issuer may find valuable.

Figure 24:
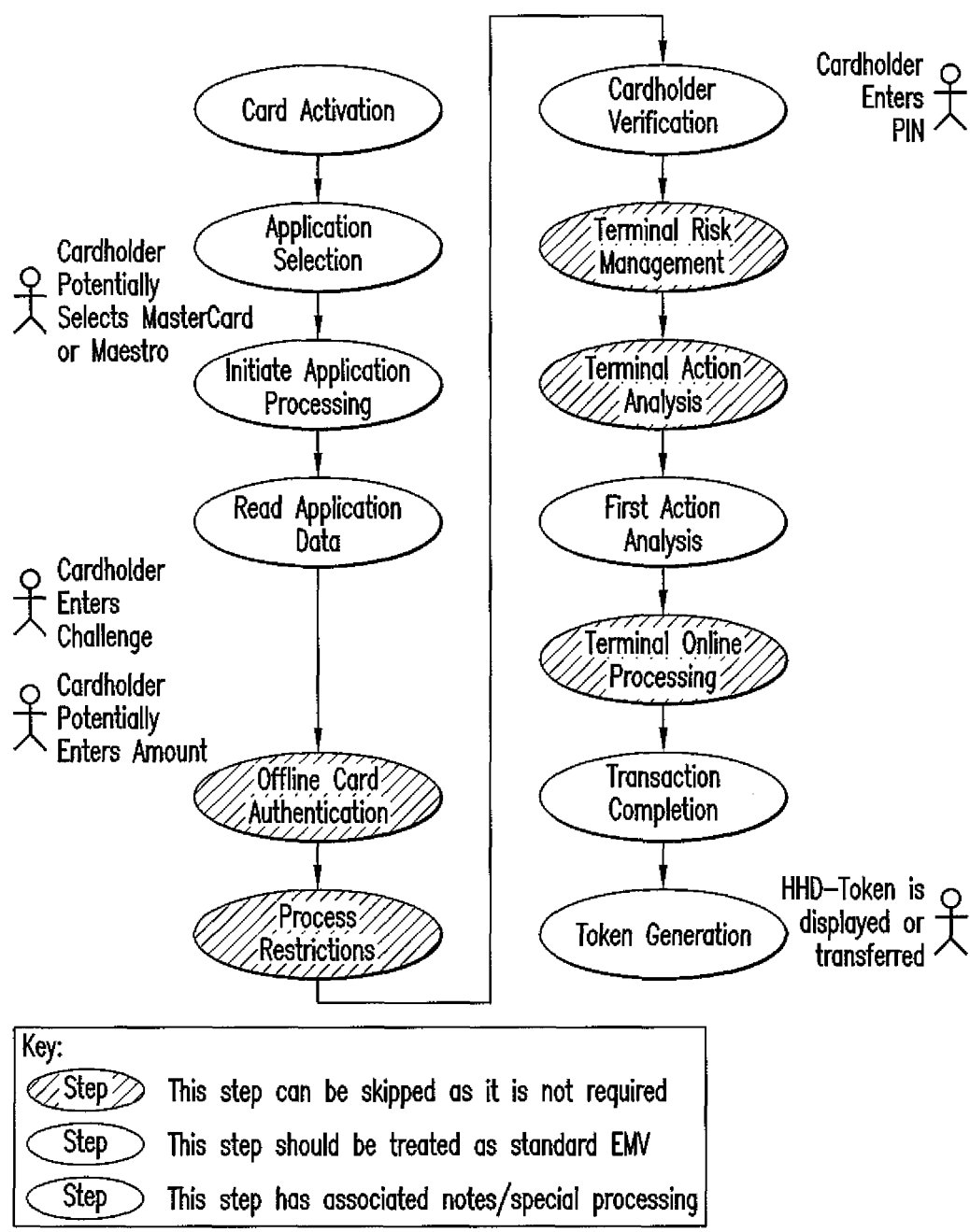
FIG. 24 shows a process flow from card activation until token generation according to an embodiment of the present invention.

FIG. 24 shows the steps involved in a standard transaction and will be described below:

1. Card Activation: The Card must be inserted in the card reader when making the transaction.
2. Application Selection: The application selection process is the process by which the terminal uses data in the ICC to determine the ICC application to be used to produce an authentication cryptogram. The process consists of two steps:
Create a list of ICC applications that are supported by the terminal. Select the application to be run from the list generated above.
3. Initiate Application Processing: The terminal initiates transaction processing.
4. Read Application Data: The terminal reads the data indicated by the AFL.
5. Offline Card Authentication: Data and Card authentication may be performed by the terminal to confirm the legitimacy of critical ICC-resident data and to authenticate the ICC. The Personal Card-reader, as used for the Chip-UCAF Authentication service, can be considered an online-only terminal, the terminal application therefore does not need to perform offline Card Authentication as indicated in the settings of the Application Interchange Profile. This means the terminal does not need to verify the card inserted in the terminal is genuine, this can be left to the Card Issuer when validating the cryptogram.
6. Process Restrictions: The purpose of the processing restrictions function is to determine the degree of compatibility of the application in the terminal with the application in the ICC and to make any necessary adjustments, including possible rejection of the transaction.

The terminal application does not need to perform these tests as irrespective of the outcome the terminal will request an ARQC (but also accept an AAC if the ICC 'declined' the request) or an AAC.

7. Cardholder Verification: The Chip-UCAF Authentication Scheme may require a valid PIN (Personal Identification Number) to authenticate the Cardholder. Alternatively, the transaction may be approved using PIN Less Authentication, as further described herein.

8. Terminal Risk Management: Terminal risk management is that portion of risk management performed by the terminal to protect the acquirer, issuer, and system from fraud. Since the Card Issuer will process the transaction online anyway, Terminal Risk Management is optional.

9. Terminal Action Analysis: Once terminal risk management and application functions related to a normal offline transaction have been completed, the terminal makes the first decision as to whether the transaction should be approved offline, declined offline, or transmitted online.

10. First Action Analysis: An ICC may perform its own risk management to protect the issuer from fraud or excessive credit risk. As a result of the risk management process, an ICC may decide to complete a transaction online or offline or request a referral or reject the transaction. The terminal will ask the card to generate an Application Cryptogram, either an ARQC or an AAC. Bit 7 of the Internet Authentication Flags (IAF) indicates whether to ask for an ARQC (set to 0) or an AAC (set to 1). If the ICC is asked to generate an ARQC, P1 of the APDU is set to 0.times.80. If the ICC is asked to generate an AAC, P1 of the APDU is set to 0.times.0. With the request the terminal must include specific data; e.g.:
Amount, Authorized.
Terminal Country Code.
Terminal Verification Results.
Transaction Currency Code.
Transaction Date.
Transaction Type.
Unpredictable Number.
Terminal Type.
Data Authentication Code.

The terminal builds the data string to be included with the GENERATE AC command. The ICC will generate an application cryptogram (AC) over the data items and other data items held by the card. The response of the terminal to the GENERATE AC command includes the AC and the other data held by the card that was included in the cryptogram generation;
Cryptogram Information Data (CID)
Application Transaction Counter (ATC)
Optional Issuer Application Data (IAD)
Other data elements may be returned as well but may be ignored by the terminal application.

11. Terminal Online Processing: Online processing is normally performed to ensure that the issuer can review and authorize or reject transactions that are outside acceptable limits of risk defined by the issuer, the payment system, or the acquirer. For Personal Card reader terminal applications, the equivalent to the online processing stage prepares the data token, displayed to the cardholder, from the GENERATE AC response data. However, this in fact does not occur until the transaction with the ICC has been completed and is described below. The terminal does not need to perform any Online Processing.

12. Issuer to Card Script Processing: an issuer may provide command scripts to be delivered to the ICC by the terminal to perform functions that are not necessarily relevant to the current transaction but are important for the continued functioning of the application in the ICC. The Personal Card-reader does not have the capability to provide command scripts and so the terminal does not perform this step.

13. Transaction Completion: The completion function closes processing of a transaction. The terminal always performs this function unless the transaction is terminated prematurely by error processing. Some card implementations may, according to their internal risk management, generate an AAC rather than an ARQC. Bit 8 of the CID will determine whether the card generated an AAC or an ARQC. If bit 8 is 0, the card generated an AAC. If bit 8 is 1, the card generated an ARQC. If the ICC returned an AAC with the first GENERATE AC, then the transaction was "declined offline" and no further processing is required. If the ICC returned an ARQC with the first Generate AC command, then the terminal should request the card to generate an AAC. With this request the terminal must include specific data, e.g. from the following data list:
Amount, Authorized.
Terminal Country Code.
Terminal Verification Results.
Transaction Currency Code.
Transaction Date.
Transaction Type.
Unpredictable Number.
Terminal Type.
Data Authentication Code.

The terminal builds the data string to be included with the Generate AC command. The ICC will generate an application cryptogram (AC) over the data items in the CDOL2. The transaction state within the ICC is now, closed and the card may now be powered off.

14. Token Generation: When a successful transaction has been closed with the card, the terminal must generate the token to be presented to the cardholder. The token is generated from the response to the first, or only, GENERATE AC according to the IIPB value. The token must only be displayed to the cardholder if the card is physically present in the terminal. This means that even if the card remains in the reader throughout the period of interaction between the PCR and the ICC, if it is removed whilst the token is being displayed, the terminal must clear its display and switch itself off. In the above scheme, any errors, indicated in return codes from the ICC, by Cardholder action, or detection of errors by the terminal, must result in the processing of the transaction being stopped and an appropriate error message being displayed before the PCR itself is switched off. The PCR must not generate and display a token in such circumstances.

While the foregoing embodiments have generally described a process by which an ICC is personalized with a specific IIPB, it is also possible to perform the described process where the card is not personalized. Perso Less Authentication (PLA) refers to an authentication process in which the ICC does not have personalized information but instead uses logic and data in the card reader or terminal (PCR) to generate the data token. For example, the ICC may not contain a stored IIPB which it transmits to the PCR. Instead, the PCR stores at least one IIPB and uses one of the stored IIPBs as the IIPB for the transaction. The PCR may store a single IIPB, although typically more than one will be stored so as to permit the reader to carry out these techniques with many different card types in the field which were not previously personalized and therefore configured to perform the authentication techniques of the present invention. For example, a PCR with a single IIPB may not be compatible with all types of ICCs because each type of ICC may need to send a different amount of information. Thus, the PCR may store several IIPBs and use an IIPB selection process to determine which IIPB to use for the transaction. The issuer will use a similar selection process based on the information it receives to determine which IIPB was used to generate the data token.

Figure 25:
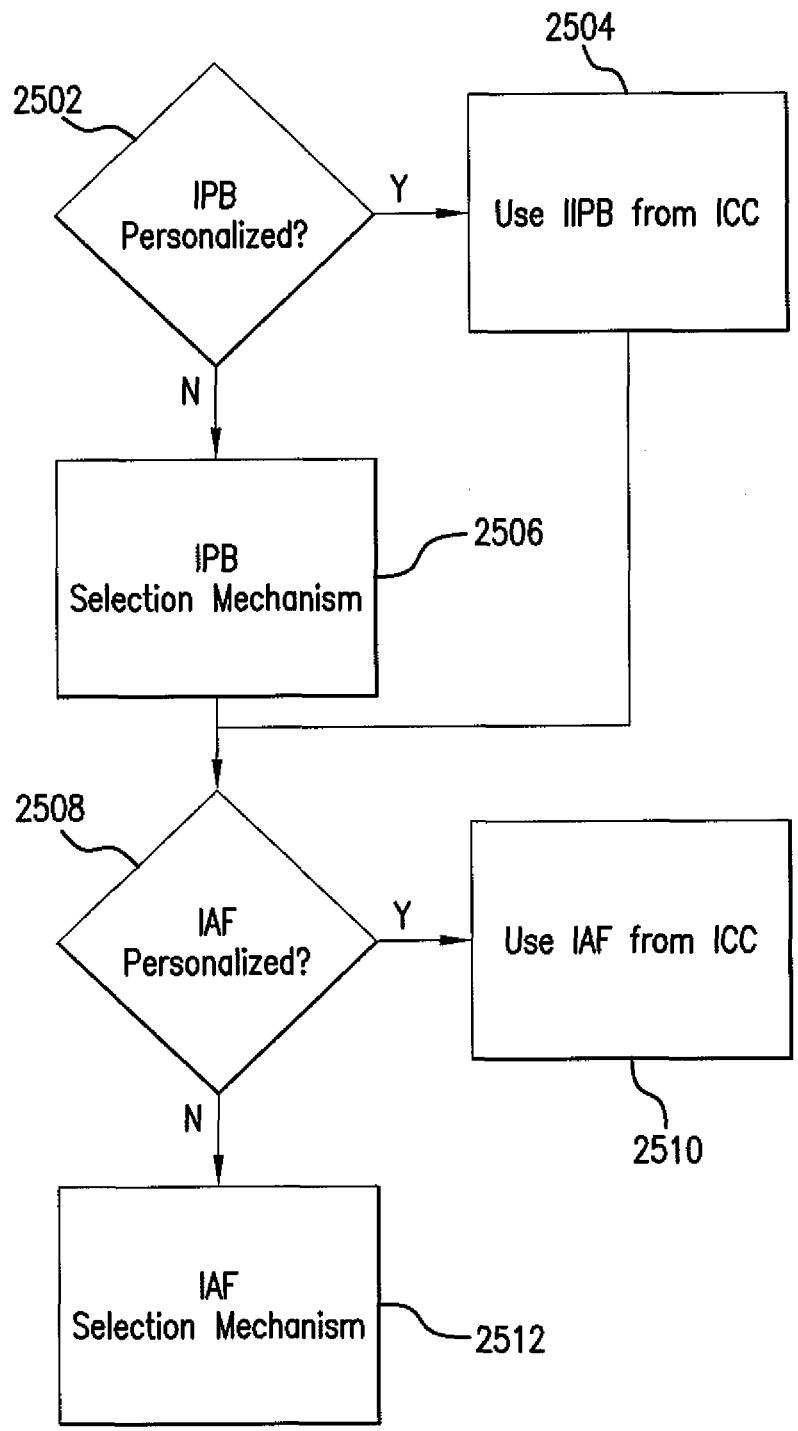
FIG. 25 illustrates an exemplary embodiment of the process a PCR having Perso Less Authentication functionality may use to select an IIPB and an IAF.

An exemplary embodiment of the PLA process is illustrated in FIG. 25, which describes the IIPB and IAF selection mechanisms of a PLA PCR, which will be called a PLA reader. The PLA reader may store several IIPBs in memory and may also contain at least one IAF.

At 2502, the PLA reader determines whether the card has a personalized IIPB. If the card does contain an IIPB, the PLA reader uses that IIPB at 2506. If however, the card does not contain an IIPB, the PLA reader uses an IIPB selection mechanism to determine which of the stored IIPBs to use for a specific transaction. The IIPB may be selected based on the information in the cryptogram received from the ICC. The IIPB may also be selected based on additional data received from the ICC (e.g., the Issuer Application Data—IAD).

Figure 26:
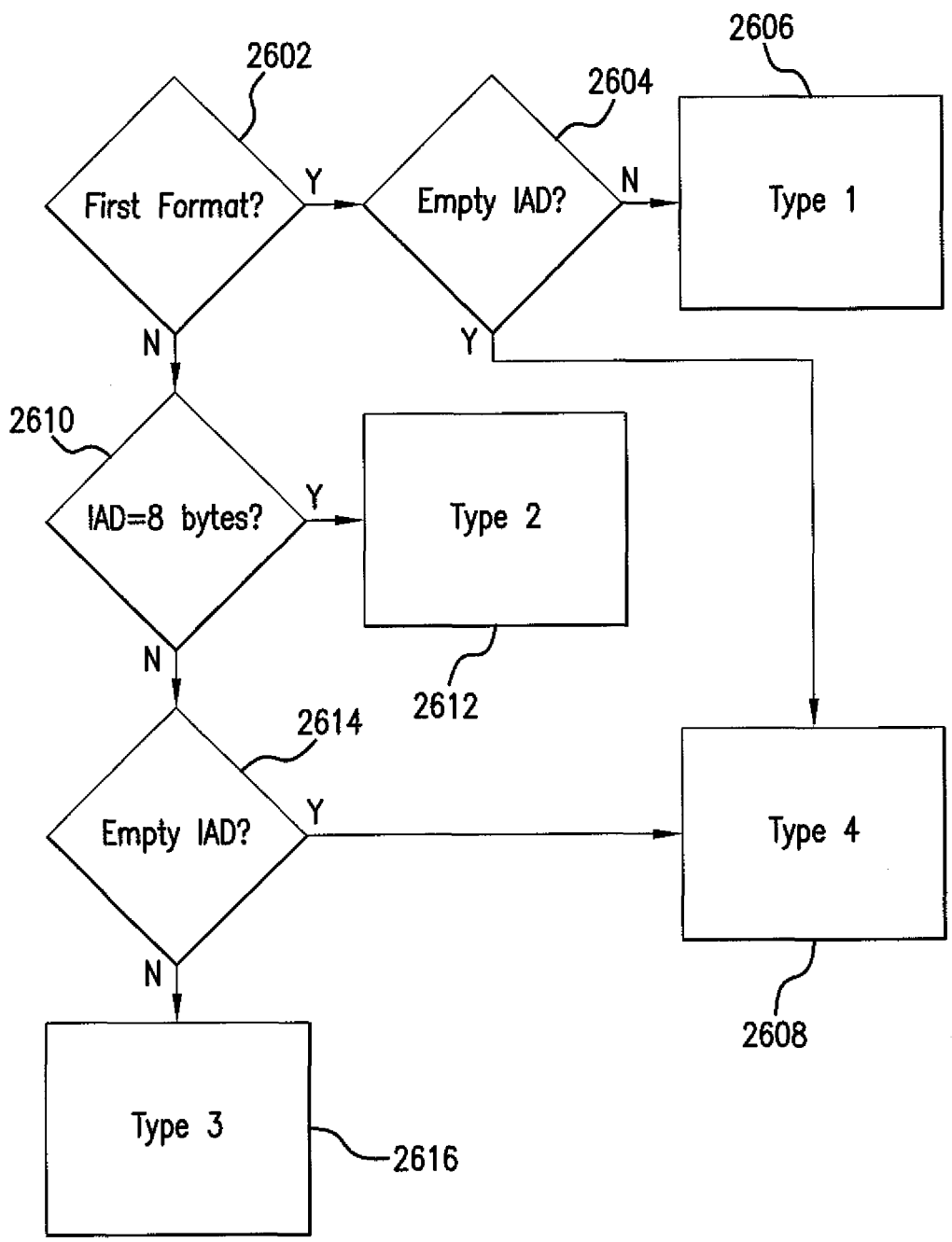
FIG. 26 illustrates an exemplary embodiment of the bitmap selection process.

An exemplary embodiment of the IIPB selection process is illustrated in FIG. 26. FIG. 26 describes an IIPB selection mechanism for a PLA reader which stores four default IIPBs. IIPBs 1-4 relate to ICC types 1-4 respectively or, more specifically, to four types of cryptograms and additional data (e.g., the IAD) transmitted from the ICC to the PLA reader. ICC type 1 returns a cryptogram and additional data in a first format, while ICC types 2 and 3 return a cryptogram and additional data in a second and third format, which may be the same. However, the important point for the purposes of this example is that ICC types 2 and 3 do not return additional data next to the cryptogram in the first format. In addition, ICC types 1-3 will all return an IAD. ICC type 2 will return an IAD of 8 bytes, while ICC type 3 will not (ICC type 3 may, for example, return an IAD of 4 bytes). ICC type 4 refers to an EMV card which returns an empty IAD.

At 2602, the PLA reader determines whether the cryptogram and additional data are in a first format. If the PLA reader determines the cryptogram and additional data are in a first format, the PLA reader determines whether the returned IAD is empty at 2604. If the IAD is not empty, the PLA reader determines that the ICC is a type 1 ICC and selects the corresponding IIPB (IIPB 1) for use in generating the data token at 2606. If the IAD is empty, the PLA reader determines that the ICC is an EMV card with empty IAD (a type 4 ICC) and selects the corresponding IIPB (IIPB 4) at 2608.

If the PLA reader determines the cryptogram and additional data are not in a first format at 2602, the PLA reader determines the length of the IAD at 2610. If the IAD is 8 bytes, the PLA reader selects the IIPB corresponding to ICC type 2 at 2612. Otherwise, the PLA reader proceeds to 2614 to determine whether the IAD is empty. If the IAD is empty, the PLA reader selects the stored IIPB corresponding to an EMV card with an empty IAD. Otherwise, the PLA reader selects the stored IIPB corresponding to ICC type 3 for use in generating the data token. While an embodiment of the selection process has been described using four stored IIPBs and certain data to distinguish them, a person skilled in the art will recognize that a greater or lesser number of IIPBs may be provided, and additional data may be used to distinguish between them, without departing from the scope of the described process.

Once the IIPB has been selected, the PLA reader may also need to adjust the IIPB. First, the PLA reader determines whether the IIPB expects or requires an IAD. If not, the PLA reader does not need to select an IAD. If an IAD is expected or required, the PLA reader compares the length of the IAD expected or required by the IIPB (the IIPB IAD) with the length of the IAD received from the ICC (Card IAD). If the length of the IIPB IAD is the same as the Card IAD, the Card IAD is used in building the authentication token. If the length of the Card IAD is larger than the length of the IIPB IAD, the IIPB IAD is augmented with enough bytes of data to make it the same length as the Card IAD, each of the added bytes are set to 0, and the augmented IIPB is used to build the authentication token, so the information will not be included in the authentication token. If the length of the IIPB IAD is greater than the length of the Card IAD, the Card IAD is augmented with enough bytes to make it the same length as the IIPB IAD. The added bytes may be set to the values indicated by certain bytes of the authentication cryptogram, for example, bytes 3-6. If more than 4 bytes are added, the same bytes are used repeatedly.

Returning to FIG. 25, after the IIPB has been selected, the PLA reader determines whether the ICC includes a personalized IAF at 2508. If the card does contain an IAF, the PLA reader will use that IAF at 2510. Otherwise, the PLA reader proceeds to an IAF selection mechanism at 2512. The IAF reader may go through a similar process as described in relation to the IIPB in FIG. 26. The IAF selection mechanism may also be based on whether the IIPB is personalized. For example, the PLA reader may use the default IAF 00 if the IIPB is personalized or use the default IAF F0 if the IIPB is not personalized.

When using the default values for IAF, additional information may be needed in order to generate the data token. If the default IAF indicates additional information is needed, a similar selection process may be utilized. For example, the IAF may indicate that the PAN Sequence Number (PSN) should be included in the data token. If a PSN is personalized on the selected application on the card, the PLA reader uses this value. However, if no PSN value can be retrieved from the selected application, the PLA reader must select a predetermined data element from the authorization cryptogram or message authentication code (for example, the nth byte) to use as the PSN.

A data token generated by a PLA reader may contain more bits than a data token generated by a non-PLA reader PCR. In order to maintain a smaller data token size, which may be especially important for unconnected PLA readers where the cardholder must transfer the data token from the PLA reader to the Cardholder IA, the data token may be generated or later converted using alphanumeric characters instead of numeric characters. The use of alphanumeric characters allows for a token in base 36 format (0-9 and A-Z) instead of the base 10 format which is used for numeric characters. Optionally, certain of the alphanumeric characters may be removed from the sequence in order to avoid confusion, which may result in a token in base 32 format. For example, the letter O could be removed as too similar to the number 0, and the letter I could be removed as too similar to the number 1. The use of alphanumeric characters may be communicated through the use of discretionary data fields, such as indicated bytes of the IAF.

The described process may also be implemented using a PIN Less Authentication (PINLA) process. If certain conditions are met, the PCR may skip the cardholder verification process (e.g., offline PIN verification) and proceed to the next step. The conditions may include a certain bit of a selected data element being set to 1 (or 0), the selected application on the card including certain information, or any other information transmitted from the ICC to the PCR. However, if the selected application supports offline PIN verification, the cardholder must successfully validate the PIN in order for the PCR to generate the data token.

Figure 27:
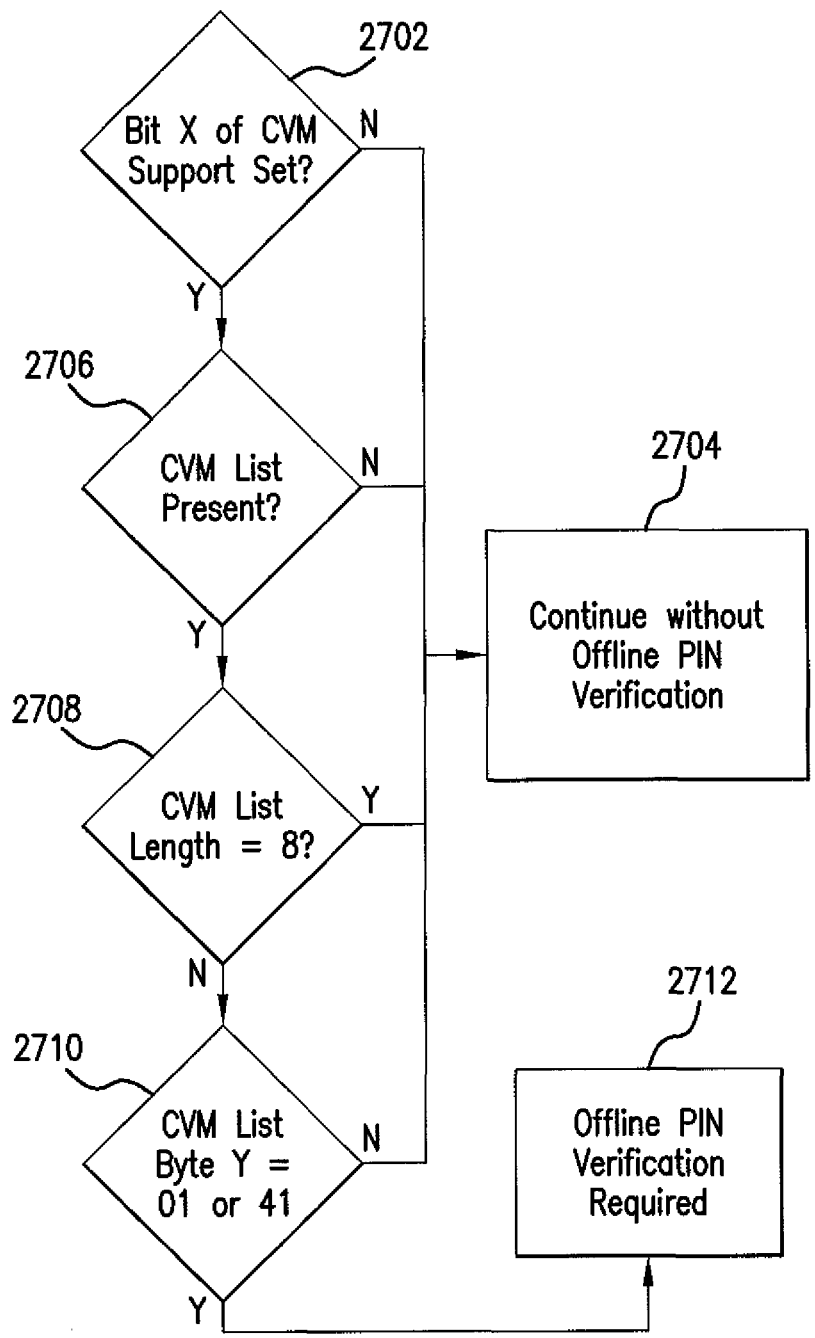
FIG. 27 illustrates an exemplary embodiment of the process a PCR having PIN Less Authentication functionality may use to determine whether offline PIN verification is required.

FIG. 27 illustrates an exemplary embodiment of the CVM List Management process which determines whether a PINLA reader will require offline PIN verification in order to generate a data token. At 2702, the PINLA reader determines whether a certain bit (Bit X) of a CVM Support data element is set. This bit may be designed to indicate whether the application supports offline PIN verification. If bit X of the CVM Support data element is not set, the process continues without offline PIN verification at 2704. Otherwise, the PINLA reader determines whether the CVM List is present at 2706. If no CVM List exists, the process continues without offline PIN verification. Otherwise, the PINLA reader determines whether the CVM List Length contains 8 bytes at 2708. If the CVM List contains 8 bytes, the process continues without offline PIN verification at 2704. Otherwise, the PINLA reader determines whether the CVM List contains a rule that specifies offline PIN verification must be used at 2710. This may be accomplished by setting a certain byte of the CVM List (Byte Y) to a certain value or values (e.g., 01 or 41) to indicate that offline PIN verification is not required. If the CVM List contains a rule that offline PIN verification is required before the PINLA may generate a data token, the process continues to offline PIN verification as previously described herein. While an exemplary process for determining whether offline PIN verification is required has been described, a person having skill in the art will recognize that modifications may be made to the process without departing from the scope of the invention. The process may include an abort option if, for example, the CVM List length is less than 8 bytes.

When using the PINLA reader, a data element requiring an indication that the PIN has been verified (CVM Results) may still be requested without requiring that the PIN be entered. If the card supports offline PIN verification, the regular process as previously described would be applied. However, if the card does not support offline PIN verification, the PINLA reader may set the CVM Results to a default value.

An example of a PINLA reader setting a PIN verification element to a default value will be described with further reference to FIG. 27. Whenever the process reaches the decision to continue without offline PIN verification at 2704, the PIN verification will be set to a default value. The value for the PIN verification data element stored on the card will only be used where the application on the ICC requires offline PIN verification (i.e., if the process reaches step 2712). The application will verify whether the PIN is correct and set the PIN verification data element to the stored value if the PIN is correct. If the PIN is incorrect, the process will continue as previously described herein.

While both a PLA reader and a PINLA reader have been described, those having skill in the art will recognize that they are not necessarily separate systems. A single PCR may be both a PLA reader and a PINLA reader. More specifically, a single PCR may include both Perso Less Authentication and PIN Less Authentication functionality.

The foregoing merely illustrates the principles of the disclosed subject matter. Various modifications and alterations to the described embodiments will be apparent to those skilled in the art in view of the inventors' teachings herein. Features of existing authorization may be seamlessly integrated into the exemplary embodiments of the present invention. It will thus be appreciated that those skilled in the art will be able to devise numerous systems and methods which, although not explicitly shown or described herein, embody the principles of the disclosed subject matter and are thus within its spirit and scope.

We claim:

1. A method for authenticating a transaction using an authentication token generated by a personal card reader, the method comprising:
   requesting data from an integrated circuit card (ICC);
   receiving a response from said ICC, said response comprising an authentication cryptogram;
   storing at least two default bitmaps in a memory portion of said personal card reader prior to said receiving a response from said ICC during said transaction;
   selecting one of said at least two default bitmaps using a bitmap selection mechanism;
   building, by said personal card reader, said authentication token using said selected default bitmap and said authentication cryptogram; and
   communicating said authentication token to a third party,
   wherein an issuer associated with said ICC uses at least a part of said authentication token to authenticate said transaction.

2. The method of claim 1, further comprising:
   receiving a PIN entered by a cardholder; and
   requesting said ICC to verify said PIN.

3. The method of claim 1, further comprising:
   storing a default value in said memory portion of said personal card reader;
   determining that a cardholder verification process is not required for a selected application; and
   setting a PIN verification data element to said default value.

4. The method of claim 1, wherein said bitmap selection mechanism identifies said selected default bitmap based on information received from said ICC.

5. The method of claim 4, wherein said information received from said ICC comprises said authentication cryptogram.

6. The method of claim 4, wherein said information received from said ICC comprises application data.

7. The method of claim 1, further comprising determining that a personalized bitmap is not stored on said ICC.

8. The method of claim 1, wherein communicating said authentication token to a third party comprises displaying said authentication token on a personal card reader display.

9. The method of claim 1, wherein communicating said authentication token to a third party comprises transmitting said authentication token to a cardholder interface application.

10. The method of claim 1, wherein communicating said authentication token to a third party comprises transmitting said authentication token to a merchant associated with said transaction through a cardholder interface application.

11. The method of claim 1, wherein requesting data from an ICC comprises transmitting a command to said ICC to generate and return said authentication cryptogram.

12. The method of claim 1, further comprising:
   receiving a challenge, said challenge comprising at least a portion of an unpredictable number; and
   transmitting said unpredictable number to said ICC;
   wherein said ICC uses said unpredictable number to generate said authentication cryptogram.

13. A personal card reader for generating an authentication token for use in authenticating a transaction, the personal card reader comprising:
   a transmitter configured to request data from an integrated circuit card (ICC), said transmitter further configured to communicate an authentication token to a third party;
   a receiver configured to receive a response from said ICC, said response comprising an authentication cryptogram;
   a memory portion storing at least two default bitmaps stored prior to receiving data from the ICC during said transaction;
   at least one processor implementing a bitmap selection mechanism configured to select one of said at least two default bitmaps; and the at least one processor further implementing an authentication token generation unit configured to build an authentication token using said authentication cryptogram and said selected default bitmap;

wherein said authentication token is used by an issuer associated with said ICC to authenticate said transaction.

14. The personal card reader of claim 13, further comprising:

an input unit configured to receive a PIN from a cardholder;

wherein said transmitter is further configured to transmit said PIN to said ICC for verification.

15. The personal card reader of claim 13, wherein said memory portion is further configured to store a default value, further comprising:

a determination unit configured to determine that a cardholder verification process is not required for a selected application; and a setting unit configured to set a PIN verification data element to said default value.

16. The personal card reader of claim 13, wherein said bitmap selection mechanism comprises the at least one processor programmed to identify said selected default bitmap based on information received from said ICC.

17. The personal card reader of claim 16, wherein said information received from said ICC comprises said authentication cryptogram.

18. The personal card reader of claim 16, wherein said information received from said ICC comprises application data.

19. The personal card reader of claim 13, further comprising a personalized bitmap determination unit, coupled to said receiver, configured to determine that a personalized bitmap is not stored on said ICC.

20. The personal card reader of claim 13, further comprising a display configured to display said authentication token to a cardholder.

21. The personal card reader of claim 13, wherein said transmitter is configured to transmit said authentication token to a cardholder interface application.

22. The personal card reader of claim 13, wherein said transmitter is configured to transmit said authentication token to a merchant associated with said transaction through a cardholder interface application.

23. The personal card reader of claim 13, wherein said transmitter is configured to transmit a command to said ICC to generate and return said authentication cryptogram.

24. The personal card reader of claim 13, wherein said receiver is further configured to receive a challenge, said challenge comprising at least a portion of an unpredictable number, and wherein said transmitter is further configured to transmit said unpredictable number to said ICC, and wherein said ICC uses said unpredictable number to generate said authentication cryptogram.

* * * * *